(12) United States Patent
Bindana

(10) Patent No.: US 11,875,071 B2
(45) Date of Patent: Jan. 16, 2024

(54) METHODS AND SYSTEMS FOR TRANSFERRING PRINTING RIGHTS IN SECURE PRINTING ENVIRONMENT

(71) Applicant: XEROX CORPORATION, Norwalk, CT (US)

(72) Inventor: Srinivasarao Bindana, Kakinada (IN)

(73) Assignee: Xerox Corporation, Norwalk, CT (US)

( * ) Notice: Subject to any disclaimer, the term of this patent is extended or adjusted under 35 U.S.C. 154(b) by 595 days.

(21) Appl. No.: 17/128,901

(22) Filed: Dec. 21, 2020

(65) Prior Publication Data
US 2022/0197576 A1 Jun. 23, 2022

(51) Int. Cl.
| | |
|---|---|
| G06F 3/12 | (2006.01) |
| G06F 21/31 | (2013.01) |
| G06F 9/48 | (2006.01) |
| G06F 9/54 | (2006.01) |
| G06F 21/60 | (2013.01) |

(52) U.S. Cl.
CPC ............ G06F 3/1238 (2013.01); G06F 3/126 (2013.01); G06F 3/1222 (2013.01); G06F 3/1253 (2013.01); G06F 9/4881 (2013.01); G06F 9/542 (2013.01); G06F 21/31 (2013.01); G06F 21/608 (2013.01); G06F 2221/2145 (2013.01)

(58) Field of Classification Search
CPC ............ G06F 2221/2145; G06F 21/31; G06F 3/1253; G06F 9/542; G06F 3/1222; G06F 3/1267; G06F 3/126; G06F 3/1285; G06F 9/4881; G06F 3/1238; G06F 21/608
USPC .......................................................... 726/2
See application file for complete search history.

(56) References Cited

U.S. PATENT DOCUMENTS

| | | | | |
|---|---|---|---|---|
| 8,763,137 | B2 * | 6/2014 | Shigeeda | ............... G06F 21/608 726/28 |
| 2016/0259602 | A1 * | 9/2016 | Dalaa | .................... G06F 21/608 |

* cited by examiner

*Primary Examiner* — Bryan F Wright

(57) ABSTRACT

The present disclosure discloses methods and systems for transferring rights, to release a secure print job from one user to another user. The rights to release the secure print job can be transferred based on a request from a primary user i.e., the user who submits the secure print job or based on a request from a secondary user i.e., the user who wants to release the secure print job on behalf of the primary user. Based on the request from any user, a multi-function device transfers rights to release the secure print job from the primary user to the secondary user. Here, transferring rights includes changing ownership of the secure print job from the primary user to the secondary user. Upon successful changing the ownership, the secondary user releases the secure print job originally submitted by the primary user.

27 Claims, 22 Drawing Sheets

Identification Details

Username*: Joe — 521, 521a
Employee ID*: 10845 — 523, 523a
Department*: Hardware - Core — 525, 525a
Document Requested: Client Data — 527, 527a Set Passcode*: **** — 529, 529a
Comments (Optional) — 531, 531a

SUBMIT — 511
CANCEL

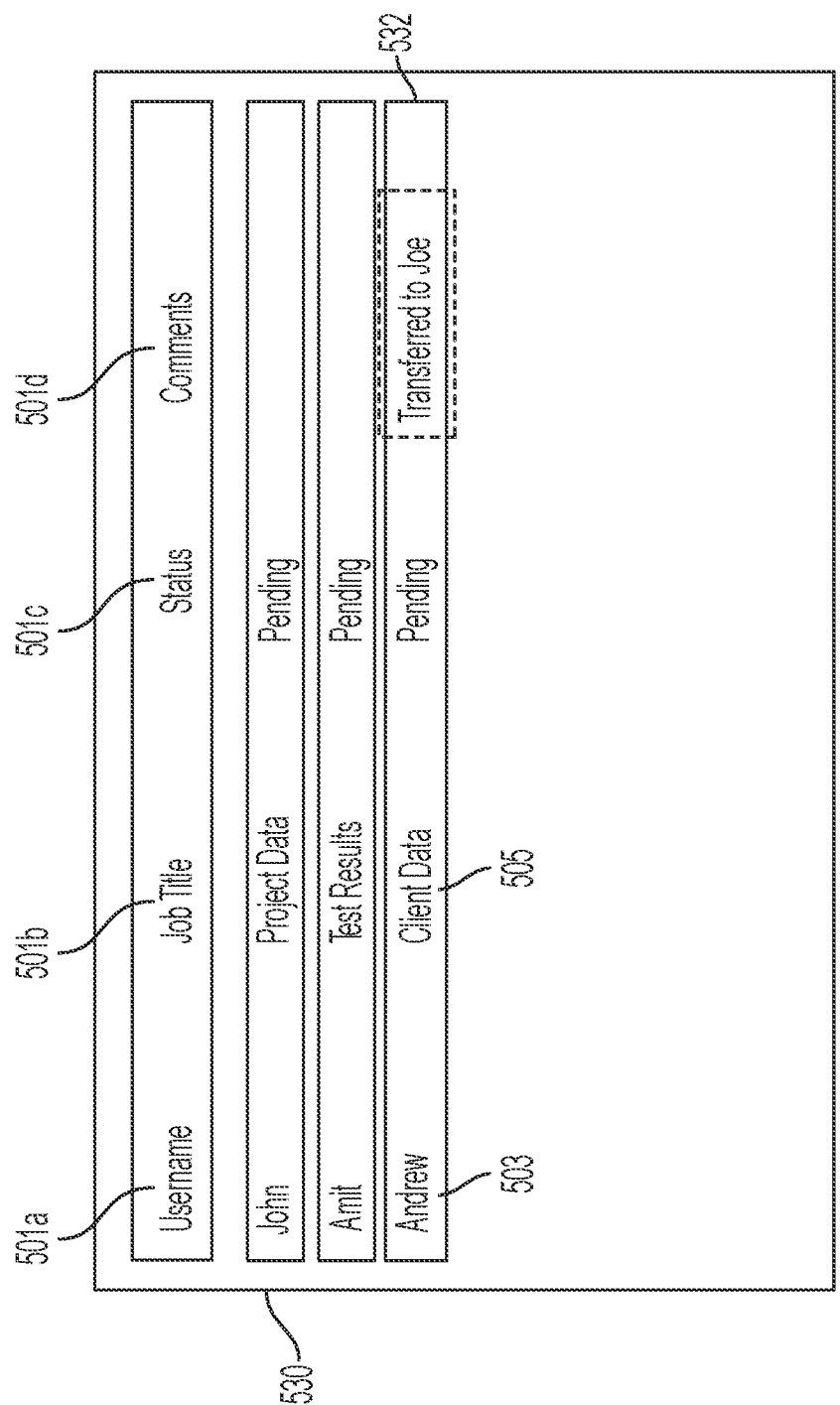

METHODS AND SYSTEMS FOR TRANSFERRING PRINTING RIGHTS IN SECURE PRINTING ENVIRONMENT

TECHNICAL FIELD

The present disclosure relates to the field of secure printing. More specifically, the disclosure relates to methods and systems for transferring printing rights in a secure printing environment.

BACKGROUND

These days, secure printing feature is commonly seen in multi-function devices and/or printers to cater to various needs of an organization and/or users. The secure printing feature initiates printing or releases a secure print job submitted by a user only when the user provides a password or any other security code, which was earlier set by the user. This way the feature restricts other users from accessing and initiating printing of the user's document. Further, the feature of secure printing is very useful for printing confidential documents such as client documents, salary slips, medical records, identity proofs, bank documents, and so on.

There are instances when the user has a confidential document, which cannot be directly shared (such as e-copy via emails, e-copy in USB, or other modes) with other users to prevent the document from any editing or tampering but at the same time, the user is required to share the confidential document with other users because of multiple reasons. For example, a user (who is a manager) is required to share the confidential document (such as client documents) with other users (who are team members) to complete a particular task/project. Similarly, a user (who is a teacher) is required to share the confidential document such as exam results with other users such as students or students' parents. In all such cases, the only option with the user is to share print outs of the confidential document. But in these scenarios, the user himself has to do the job of giving print, standing in a queue, and collecting print outs of the confidential document for other users. This whole activity could be tedious and time consuming and may even frustrates the user.

Further, there could be scenarios when the user is not present in an office or at required location, however the user is still required to share the confidential document with other users because of various reasons. As discussed above, the user does not want to share e-copy of the confidential document but here, the option to share print outs of the confidential document is not even possible as he is not available in the office or is at a remote location.

Currently, there are no solutions available in the market that allows a user (who is at a remote location) to share confidential document with other users without sharing an e-copy of the documents. Also, there are no solutions available that allows other users to take print outs of the confidential documents without asking authentication information such as passcode, id, etc. from the user. Hence, there is a need for methods and systems to solve the above-mentioned problems.

SUMMARY

According to aspects illustrated herein, a method for transferring rights from one user to another user to release a secure print job at a multi-function device is disclosed. The method is implemented at a multi-function device. The method includes receiving a secure print job as submitted by a primary user along with a selection of an option for transferring rights to release the secure print job; receiving a request from a secondary user to release the secure print job at the multi-function device; upon receiving the request, providing a user interface to the secondary user for inputting identification details and setting a new passcode to release the secure print job; upon receiving the identification details and the new passcode, sending a notification to the primary user to accept or reject the request of the secondary user to release the secure print job, where the notification includes the identification details of the secondary user; and if the primary user accepts the request of the secondary user, performing the following: transferring the rights to the secondary user to release the secure print job at the multi-function device; allowing the secondary user to successfully release the secure print job using the new passcode as set by the secondary user; and printing the secure print job for the secondary user.

According to further aspects illustrated herein, a multi-function device for transferring rights from one user to another user, to release a secure print job, is disclosed. The multi-function device includes a controller for: receiving a secure print job as submitted by a primary user along with a selection of an option of transferring rights to release the secure print job, receiving a request from a secondary user to release the secure print job at the multi-function device, requesting the secondary user for inputting identification details and setting a new passcode to release the secure print job; upon receiving the identification details and the passcode, sending a notification to the primary user to accept or reject the request of the secondary user to release the secure print job, where the notification includes identification details of the secondary user, and if the primary user accepts the request of the secondary user, performing the following: transferring the rights to the secondary user to release the secure print job; and allowing the secondary user to release the secure print job using the new passcode as set by the secondary user. The multi-function device further includes a print engine for printing the secure print job for the secondary user; and a user interface for: displaying a job queue to the secondary user; allowing the secondary user to raise the request to release the secure print job; and inputting the identification details and the new passcode for releasing the secure print job.

According to another aspect illustrated herein, a method for transferring rights from one user to another user, to release a secure print job is disclosed. The method includes providing a user interface including one or more pre-defined options and an option to transfer rights to one or more secondary users to release the secure print job; receiving a selection of the option to transfer rights to release the secure print job and, a secure print job from a primary user; receiving identification details of the one or more secondary users to whom the rights to release the secure print job are to be transferred; authorizing the primary user to transfer the rights to the one or more secondary users; and sending the secure print job along with details to transfer the rights to release the secure print job to the one or more secondary users to a multi-function device.

According to additional aspects illustrated herein, a computing device for transferring rights from one user to another user, to release a secure print job is disclosed. The computing device includes a print driver for: providing one or more pre-defined options and an option to transfer rights to release a secure print job, to one or more secondary users; receiving a selection of the option to transfer rights and a secure print job from a primary user; receiving identification details of the one or more secondary users to whom the rights to release the secure print job are to be transferred; authorizing/authenticating the primary user to transfer the rights to the one or more secondary users; and sending the secure print job along with details to transfer the rights to release the secure print job to the one or more secondary users to a multi-function device.

According to further additional aspects illustrated herein, a method for allowing a user to release a secure print job on behalf of another user is disclosed. The method includes: receiving a request from a secondary user to release the secure print job submitted by a primary user for printing at a multi-function device; sending the request of the secondary user to the primary user for acceptance or rejection; and based on the response of the primary user, allowing the secondary user to release the secure print job at the multi-function device as submitted by the primary user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 5A-5F show exemplary snapshots of user interfaces provided on a computing device and/or a multi-function device, in accordance with an embodiment of the present disclosure.

DESCRIPTION

Figure 1A:
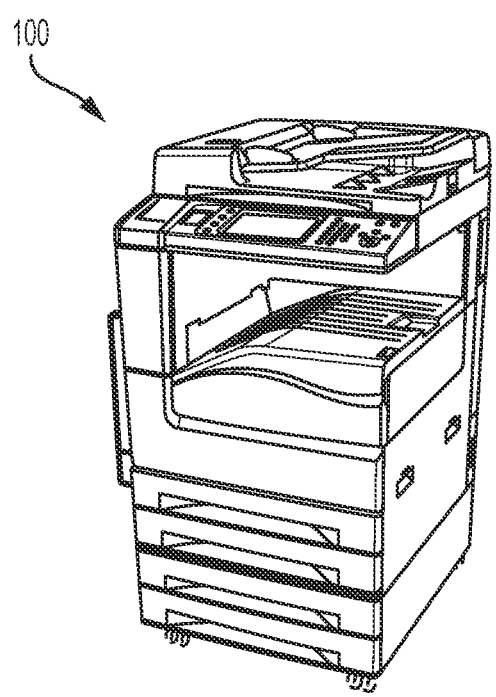
FIGS. 1A and 1B show an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" refers to a single device or a combination of devices configured to perform one or more functions such as, but not limited to, printing, imaging, scanning, copying, and so on. The multi-function device may include software, hardware, firmware, or a combination thereof. In the context of current disclosure, the multi-function device transfers rights to release a secure print job from one user (e.g., a primary user) to one or more other users (e.g., one or more secondary users), thereby allowing the one or more other users to release the secure print job at the multi-function device. The rights can be transferred based on a request of a primary user (e.g., owner of the secure print job) or one or more secondary users (e.g., users to whom the rights to release the print job are to be transferred).

The term "secure print job" refers to a job that requires user authentication information such as passcode, password, id, or any type of authentication, to release the print job at the multi-function device. Any print job described in the detailed description refers to the secure print job. For example, if a user A submits a secure print job for printing at a multi-function device, then user A requires to input his passcode to release the print job at the multi-function device.

The "primary user" refers to a user who submits a secure print job for printing and requires sharing the secure print job with one or more other users such as secondary users for various reasons. The primary user may be considered as an owner of the secure print job as he originally submits the secure print job for printing. The "one or more secondary users" refer to the users who are given/assigned rights to release the secure print job submitted by the primary user without needing any authentication information of the primary user. In other words, the "secondary users" are the ones who are allowed to release the secure print job submitted by the primary user.

The term "release" in the context of secure print job refers to initiating print based on authentication information from users such as secondary users. In the context of the current disclosure, the secondary users release the secure print job originally submitted by the primary user.

The term "passcode" refers to a password set by the primary user at time of initiating a secure print request. The passcode is required when the primary user wishes to release the secure print job placed by the primary user himself. The primary user uses his passcode when he wishes to release his secure print jobs at the multi-function device.

The term "new passcode" refers to a password set by the one or more secondary users at time of initiating a request for transferring rights. The new passcode is set only for releasing the secure print job submitted by the primary user. The new passcode set by the secondary user is different from the passcode set by/of the primary user.

The term "transferring rights" refer to rights to release the secure print job at the multi-function device. In other words, "transferring rights" refer to transferring printing rights from one user (primary user) to one or more other users (secondary users), where the one or more other users are allowed to release the secure print job originally submitted by the user. And transferring rights further include changing ownership of the secure print job from the primary user to the one or more secondary users. Transferring rights allows one or more secondary users (to whom the rights are transferred) to successfully release the secure print job submitted by the primary user.

The term "computing device" refers to any device that a user (such as a primary user, secondary users) typically uses for giving print commands, can be used for sending and/or receiving notifications or other purposes. Examples of the computing device include, but are not limited to, a personal computer, a desktop, a laptop, a mobile phone, a tablet, a Personal Digital Assistant (PDA), a smart-phone or any other device capable of data communication. The computing device includes a print driver application that allows the user to submit print commands, one or more print parameters/attributes, and a document for printing. In context of the present disclosure, the print driver application includes an option to transfer rights to one or more secondary users to release a secure print job at the multi-function device. The option further allows the primary user to provide details of the one or more secondary users to whom the rights needs to be transferred.

Overview

To address the above-mentioned problems, the present disclosure provides methods and systems for transferring rights of releasing a secure print job from one user i.e., a primary user, to one or more other users i.e., one or more secondary users. The rights can be transferred either before submitting the secure print job for printing or can be transferred when the secure print job is already submitted for printing. In the former case, the primary user himself initiates a request to transfer rights by providing details of one or more other users to whom the rights need to be transferred. Here, the one or more other users are pre-authorized by the primary user. In the latter scenario, the secondary user initiates a request at a multi-function device to transfer rights for releasing the secure print job submitted by the primary user. Here, the secondary user is authorized by the primary user. Once authorized, the rights are transferred and, then the one or more secondary users can release the secure print job without needing any information (such as passcode, id, etc.) of the primary user. This way, the primary user shares the document with the one or more secondary users without sharing an electronic version over email or via other ways as well as the primary user does not have to wait in a queue to release the secure print job for the other users. Hence, the proposed methods and systems ease the task of sharing printed e-documents with the secondary users when the primary user is unable/does not wish to share an electronic version of the documents for various reasons. More details are discussed below.

Exemplary Environment

FIG. 1A shows an exemplary environment in which various embodiments of the disclosure can be practiced. The environment includes a multi-function device 100 capable of performing one or more functions such as printing, copying, scanning, faxing, and so on. Various examples of the multi-function device 100 may be a printer, a multi-function peripheral device, or the like. The multi-function device 100 may be communicatively coupled to other devices such as a computing device (although not shown) through a communication network. The multi-function device 100 and the computing device collectively forms a system.

A user uses the multi-function device 100 for his day-to-day tasks such as printing, copying, emailing, scanning, or the faxing functionalities. In context of the present disclosure, the multi-function device 100 transfers rights of releasing a secure print job from a primary user to one or more secondary users. In implementation, the primary user submits the secure print job at the multi-function device 100 for printing. Once submitted, a secondary user initiates a request at the multi-function device 100, to release the secure print job submitted by the primary user. The multi-function device 100 then sends the secondary user's request to the primary user for acceptance or rejection. Based on the acceptance or rejection/response from the primary user, the multi-function device 100 either allows or denies the secondary user's request to release the secure print job originally submitted by the primary user. For example, if the primary user accepts the request from the secondary user, then the multi-function device 100 allows the secondary user to release the secure print job originally submitted by the primary user. Otherwise, the multi-function device 100 does not allow the secondary user to release the secure print job as submitted by the primary user.

Figure 1B:
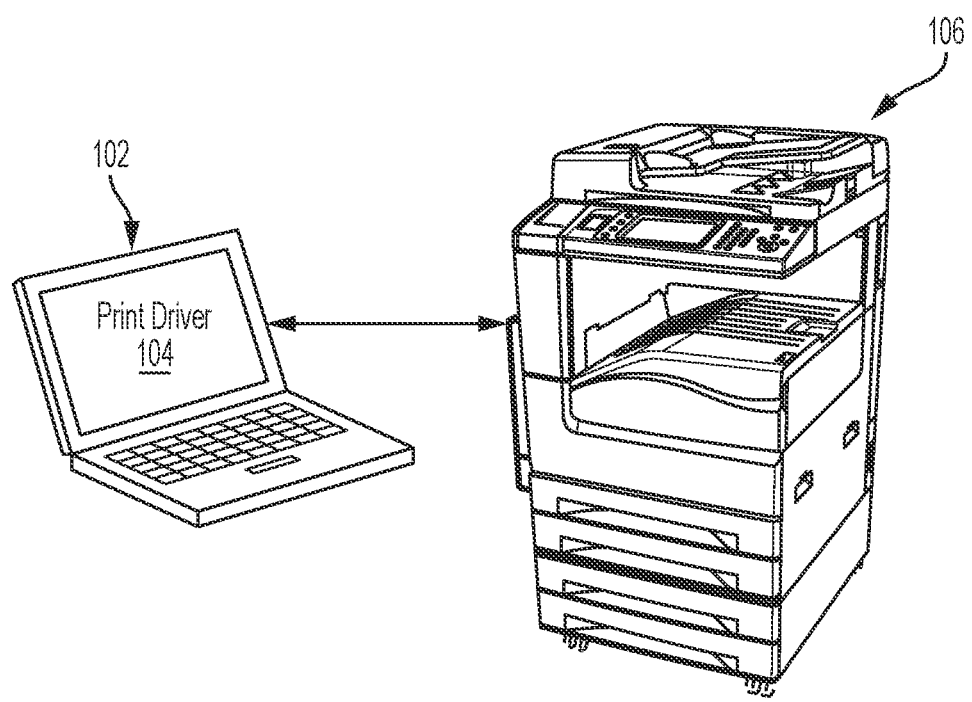

FIG. 1B shows another exemplary environment in which various embodiments of the current disclosure can be practiced. The environment includes a computing device 102 that is communicatively coupled to a multi-function device 106. A user uses the computing device 102 for his day-to-day tasks such as chatting, emailing, surfing, submitting documents for printing, or the like. Various examples of the computing device 102 may be a laptop, a personal computer, a mobile device, a personal digital assistant or any known or later developed computing device. The computing device 102 runs several applications such as a print driver 104.

In implementation, a primary user submits a secure print job through the print driver 104. The print driver 104 includes several print options for submitting the print job including, but not limited to, number of copies, black & white, print scale, orientation, number of pages, single-sided print, double-sided print, destination address. In context of the current disclosure, the print driver 104 includes a new option for transferring rights to one or more other users (i.e., one or more secondary users) to release the secure print job. The new option allows the primary user to provide details of one or more secondary users to whom the rights to release the secure print job are to be transferred. Here, the provided details may include email address, employee id, employee code, phone number, or other suitable details of the one or more secondary users. Once the primary user provides the details of one or more secondary users, he submits the secure print job for printing through the print driver 104. The print driver 104 sends the secure print job along with the details as selected by the primary user through various print options and the new option to transfer rights. As a result, the print driver 104 sends the secure print job and other details in a pre-defined format which is known or later developed format to the multi-function device 106. Upon submission through the print driver 104, the multi-function device 106 receives the secure print job and details related to the print options and the option of transferring rights. Based on the details received, the multi-function device 106 transfers the rights to the one or more secondary users to release the secure print job. The multi-function device 106 further notifies the one or more secondary users about the availability of the secure print job in a job queue at the multi-function device 106. Thereafter, the secondary users can access and release the secure print job as required at the multi-function device 106. For example, the secondary users can release the secure print job later or immediately after receiving the notification.

In the environment of FIG. 1A, a request to transfer the rights to release a secure print job is initiated after the secure print job is submitted successfully by the primary user for printing at the multi-function device 100. In such scenarios, one or more secondary users initiate the request through the multi-function device 100. However, in the environment of FIG. 1B, a request to transfer the rights to release a secure print job is initiated while/before submitting the secure print job for printing at the multi-function device 106, by the primary user. In such cases, the primary user himself initiates the request to transfer rights to the one or more secondary users by providing details of the secondary users to whom the rights need to be transferred through the print driver 104.

Exemplary System

Figure 2A:
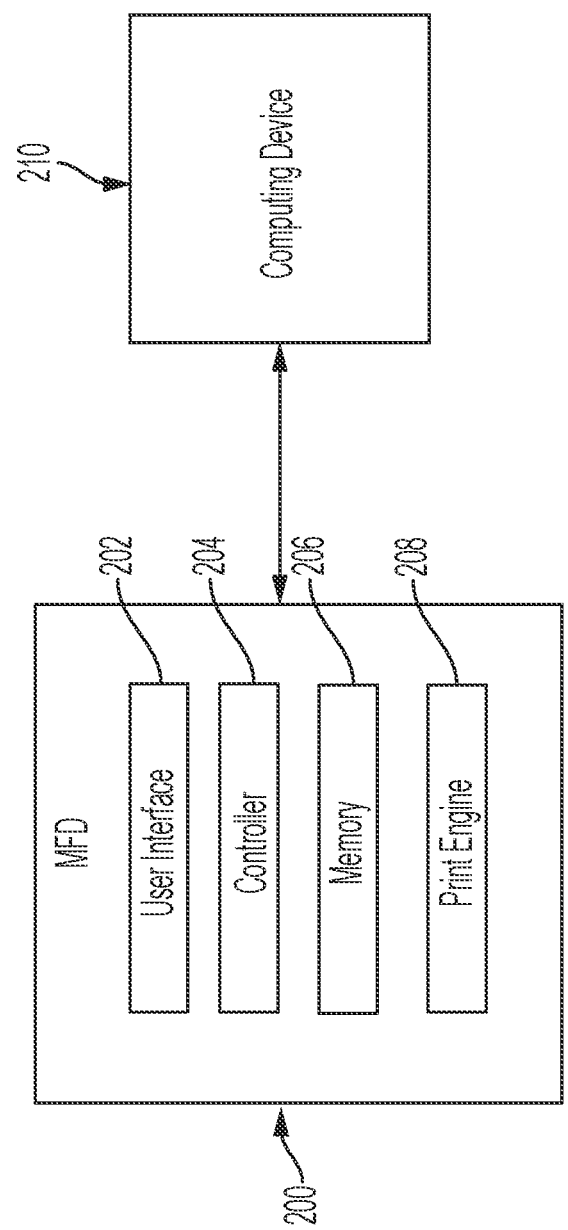
FIG. 2A is a block diagram illustrating various components of a multi-function device which is communicatively coupled to a computing device, in accordance with an embodiment of the present disclosure.

FIG. 2A illustrates a block diagram of a multi-function device 200 for implementing the current disclosure. As illustrated, the multi-function device 200 includes a user interface 202, a controller 204, a memory 206, and a print engine 208. The multi-function device 200 may further include additional component(s) as required to implement the present disclosure. The multi-function device 200 may perform functions and operations similar to the multi-function device 100 of FIG. 1A.

The components 202-208 are connected to each other via a conventional bus or a later developed protocol. And the components 202-208 communicate with each other for performing various functions of the present disclosure. For example, the controller 204 controls various operations associated with the multi-function device 200 such as, but not limited to, printing, scanning, copying, etc. In the context of current disclosure, the controller 204 facilitates transferring of printing rights from a primary user to one or more secondary users. To accomplish this, the controller 204 communicates with the print engine 208 to release a secure print job upon successful transfer of rights. Similarly, the controller 204 and other components communicate with each other for various other operations.

Further, the multi-function device 200 is communicatively coupled to a computing device 210 via a communication network (although not shown) to perform various tasks such as sending or receiving print jobs, sending, or receiving notifications or any other tasks required for implementing the current disclosure. The communication network may be a wireless network, a wired network, or a combination thereof. The communication network may be implemented as one of the different types of networks such as Intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

In operation, a primary user submits a secure print job for printing at the multi-function device 200. The secure print job includes a document in any format such as Portable Document Format (PDF), Microsoft DOC format, Hypertext Markup Language (HTML) format, Extensible Markup Language (XML) format, Microsoft XLS format (MS-XLS), Tag Image File Format (TIFF), etc. The document may further include one or more pages and may have content in the form of text, image, graphics, or a combination thereof. The primary user submits the secure print job through a computing device, for example, the computing device 210. The computing device 210 may be his laptop, a personal computer, or a mobile device. Along with the secure print job, the primary user selects an option to transfer rights indicating that he wishes to transfer rights for his secure print job to one or more secondary users. The option to transfer rights can be selected through a print driver application running on the computing device 210.

Upon successful submission, the multi-function device 200 receives the secure print job along with the selection of the transfer rights option. Specifically, the controller 204 receives the secure print job along with the selection of the transfer rights option from the primary user sent via the computing device 210.

Upon receiving, the controller 204 adds the secure print job to a job queue under the username/profile of the primary user for further processing. The secure print job is added to a job queue such as a common job queue, which may be visible to all the users through the user interface 202. The secure print job may be added to a user specific queue without deviating from the scope of disclosure. In some cases, the controller 204 tags the secure print job as job available for transfer to other users and the same can be shown in the job queue via comment section, a different color, highlight or so on. The controller 204 tags the secure print job in the job queue based on the selection of the transfer right options selected by the primary user when submitted through the print driver/computing device 210. And further the controller 204 may enable transfer rights option for those jobs in the job queue or the transfer rights option may be shown only for the jobs available for the transfer to other users and other jobs in the job queue may be shown as known. Typically, the secure print job submitted by the primary user is released by the primary user using his passcode set earlier. But in context of the present disclosure, the secure print job needs to be released by other users, for example, a secondary user. One such example is when the primary user is not available in the office and the secondary user requires to release the secure print job on behalf of the primary user. The secure print job submitted by the primary user can be released by the secondary user once printing rights/rights to release the secure print job are transferred to the secondary user.

In operation, the secondary user raises a request to release the secure print job submitted by the primary user through the user interface 202. In order to do so, the secondary user accesses the job queue and identifies the secure print job submitted by the primary user. The secure print job can be identified based on one or more of: name, employee id, employee code, phone number or other details associated with the primary user. The secure print job can be identified based on tagging in the job queue as mentioned above.

Figure 5A:
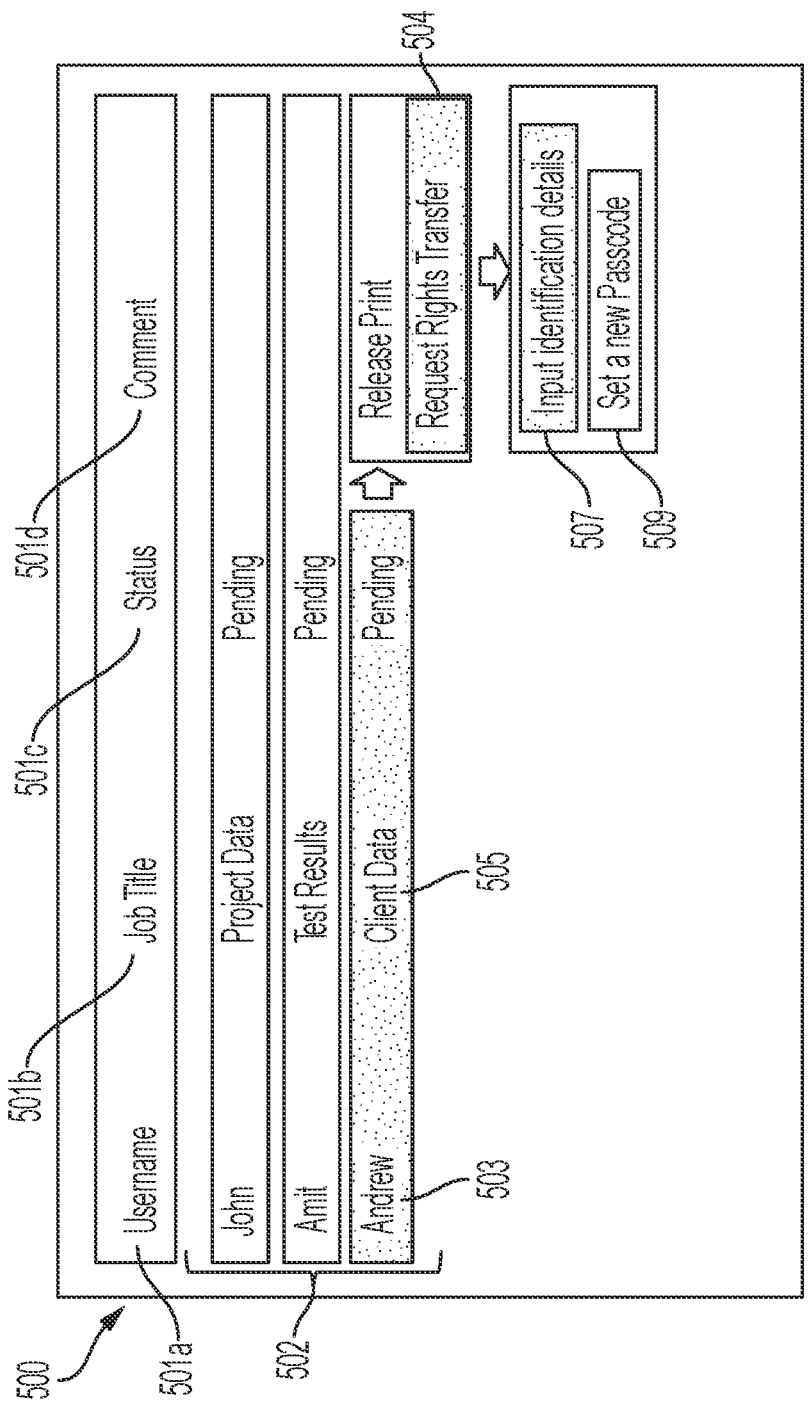

One exemplary user interface 500 is shown in FIG. 5A, where a primary user Andrew such as 503 submits a secure print job titled as 'Client Data' 505 at the multi-function device 200, and a secondary user (for example Joe although not shown) views a job queue 502 to identify the job submitted by the primary user Andrew 503 based on the username column 501a. The user interface 500 shows the job queue 502 where jobs submitted from multiple users are present and details associated with each job are indicated under columns username 501a, job title 501b, status 501c and comments 501*d*. The username field 501*a* represents the name of the user who submits the job, the job title 501*b* refers to the title of the job, the status 501*c* refers to whether the job is processed or pending for processing and the comments field 501*d* includes additional information associated with each job. For example, the comments field 501*d* may include a comment "this job is available for transfer". The secondary user Joe can identify the primary user user's Andrew 503 job based on the comment 501*d* or the username field 501*a*.

Upon identification of the secure print job, the secondary user selects the secure print job through the job queue 502. After selection, a user interface 202 is provided including an option to request rights transfer. The secondary user selects the option to raise the request to transfer rights to release the secure print job submitted by the primary user. FIG. 5A shows one such exemplary user interface 500, where the secondary user Joe selects the job 505 and then an option 504 such as 'Request Rights Transfer' to request the primary user Andrew 503 to accept his request for rights transfers in order to release the secure print job such as 505. Once selected, the controller 204 receives the request from the secondary user and further requests the secondary user to input provide his identification details (marked as 507 in FIG. 5A) and requests him to set a new passcode (marked as 509 in FIG. 5A) to release the secure print job later by the secondary user. The identification details of the secondary user may include username, user id, employee id, employee code, phone number, photo and so on. The new passcode may be numeric, alphabets, alphanumeric, or a combination thereof. An exemplary user interface 510, where the secondary user provides his identification details, and the new passcode, is shown in FIG. 5B. As per the user interface 510, the secondary user 'Joe' inputs his details corresponding to various fields such as username 521, employee id 523, department 525, document requested 527, set passcode 529, and comments 531. The secondary user input his details Joe (marked as 521*a*), 10845 (marked as 523*a*), Hardware-Core (marked as 525*a*), Client Data (marked as 527*a*), ab@1 (shown as encrypted, marked as 529*a*), any comment 531*a* in respective fields 521, 523, 525, 527, 529 and 531 and proceeds with submission via submit button 511.

Upon receiving the identification details and the new passcode from the secondary user, the controller 204 generates a notification and sends it to the primary user. The notification can be shared with the primary user via an Interactive Voice Response (IVR) call, a text message, an email, or a combination thereof. Here, the notification includes a pre-defined message and identification details of the secondary user so that the primary user can recognize the secondary user and takes a decision whether to accept his request or not. The pre-defined message may be such as "The secondary user Joe wants to release your secure print job at the multi-function device 200, please accept or reject". The notification further includes an option to accept or reject the secondary user's request for releasing the secure print job. For example, the primary user can view the notification and/or accept/reject the request through his computing device 210, for example, a mobile device. Here, the computing device used by the primary user to view the notification and accept/reject the secondary user's request may be different from the computing device 210 that is used to submit the secure print job. In other cases, the primary user may use the same computing device 210 such as mobile device to view the notification and/or accept or reject the secondary user's request that is used to submit the secure print job, without deviating from the scope of the disclosure. Upon viewing, the primary user can accept or reject the secondary user's request.

Based on the response received from the primary user, the controller 204 proceeds forward. For example, if the primary user accepts the request raised by the secondary user, the controller 204 transfers the rights to release the secure print job from the primary user to the secondary user. The rights to release the secure print job are transferred by changing the ownership of the secure print job from the primary user to the secondary user. The ownership rights are transferred from the primary user to the secondary user in the job queue such that the secondary user can release the secure print job submitted by the primary user. To accomplish this, one or more details of the secure print job are updated reflecting the change in ownership or successful transfer of rights to the secondary user. One such exemplary user interface 530 is shown in FIG. 5C, where the primary user's job 505 is transferred to the secondary user i.e., 'transferred to joe', marked as 532, as shown under the comments section 501*d*. Here, the name of the secondary user to whom the rights to release the secure print job are transferred is shown in the comments section 501*d*. Here, the comment 532 i.e., Transferred to Joe' represents that the print job 505 titled as 'Client Data' is transferred to the secondary user Joe. This is just exemplary in nature but in some cases, changes can be made under the username field 501*a*, where the name of the secondary user can be updated as 'Joe'. This way, the secure print job 505 is assigned/transferred to the secondary user 'Joe' in the job queue 502 at the multi-function device 200. At the time of accepting or rejecting the secondary user's request, the primary user authenticates/authorizes himself by inputting his passcode to ensure that he is the owner of the secure print job submitted at the multi-function device 200.

Once the secure print job is transferred to the secondary user, the controller 204 notifies the secondary user via a text message, an email, an IVR call, and so on about the acceptance. The secondary user then accesses the secure print job to release it. Before releasing, the controller 204 requests the secondary user to input the new passcode as set by him while raising the request for rights transfer. The secondary user inputs the new passcode through the user interface 202. As a result, the controller 204 matches the new passcode inputted by the secondary user with the new passcode stored in the memory 206 of the multi-function device 200. If the new passcode matches to the already stored passcode, the controller 204 initiates printing the secure print job and communicates the print engine 208 to print the secure print job. The print engine 208 prints the secure print job in accordance with print options/attributes as submitted by the primary user. Once the secure print job is printed successfully, the print engine 208 communicates the controller 204 about the successful printing of the secure print job. The controller 204 finally notifies the primary user regarding the secure job completion i.e., the secure print job is printed successfully, where the notification may be sent in the form of IVR call, text message, email and so on.

If the passcode does not match, the controller 204 requests the secondary user to input the passcode again. If matches, the controller 204 performs functionalities as discussed above. Else, the controller 204 requests the secondary user to input the passcode for a pre-defined number of times such as 2 times, 5 times or so on. If the input passcode does not match, the secure print job is not printed and the controller 204 notifies the primary user regarding the job incompletion/ not printed successfully. Consequently, the secondary user may reinitiate the request for transferring the rights to release the secure print job.

Continuing with the above, if the primary user rejects the secondary user's request, the controller 204 notifies the secondary user about the rejection.

As shown, the user interface 202 displays the job queue including the secure print job to the secondary user. The user interface 202 further allows the secondary user to raise the request to release the secure print job submitted by the primary user. Through the user interface 202, the secondary user inputs the identification details and the new passcode for releasing the secure print job. Once the secure print job is successfully transferred to the secondary user, the user interface 202 displays the secure print job under a profile/username of the secondary user in the job queue at the multi-function device 200.

The memory 206 stores the secure print job and all details/options as received through the computing device 210. The memory 206 may store all necessary details such as passcode of the primary user, new passcode of the secondary user and so on for implementing the present disclosure. The controller 204 may retrieve required details from the memory 206.

This way, the secure print job submitted by one user i.e., the primary user, can be successfully released by another user i.e., the secondary user at the multi-function device 200.

Figure 2B:
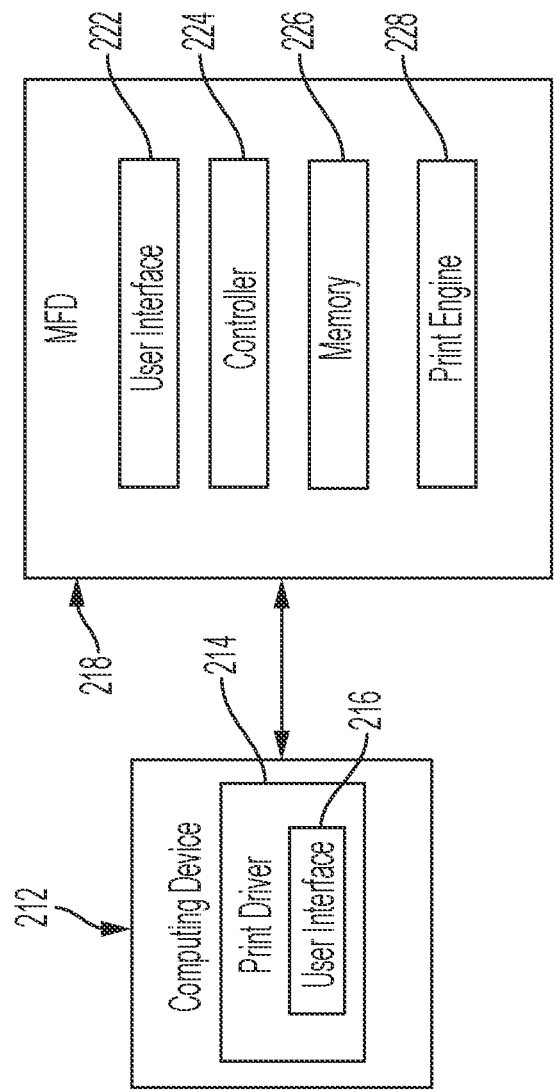
FIG. 2B is a block diagram illustrating various components of a computing device and a multi-function device, in accordance with another embodiment of the present disclosure.

FIG. 2B illustrates a block diagram of a computing device 212 and a multi-function device 218, for implementing the current disclosure. As illustrated, the computing device 212 includes a print driver 214 further including a user interface 216. The computing device 212 is communicatively coupled to the multi-function device 218 via a communication network (although not shown) to perform various tasks such as sending or receiving print jobs, sending, or receiving notifications or any other tasks required for implementing the current disclosure. Although not shown explicitly, the computing device 212 may further include additional component(s) as required to implement the present disclosure. Further, the multi-function device 218 includes a user interface 222, a controller 224, a memory 226, and a print engine 228. The multi-function device 218 may further include additional component(s) as required to implement the present disclosure. Also, the multi-function device 218 may perform functions and operations similar to the multi-function devices discussed above.

Figure 5D:
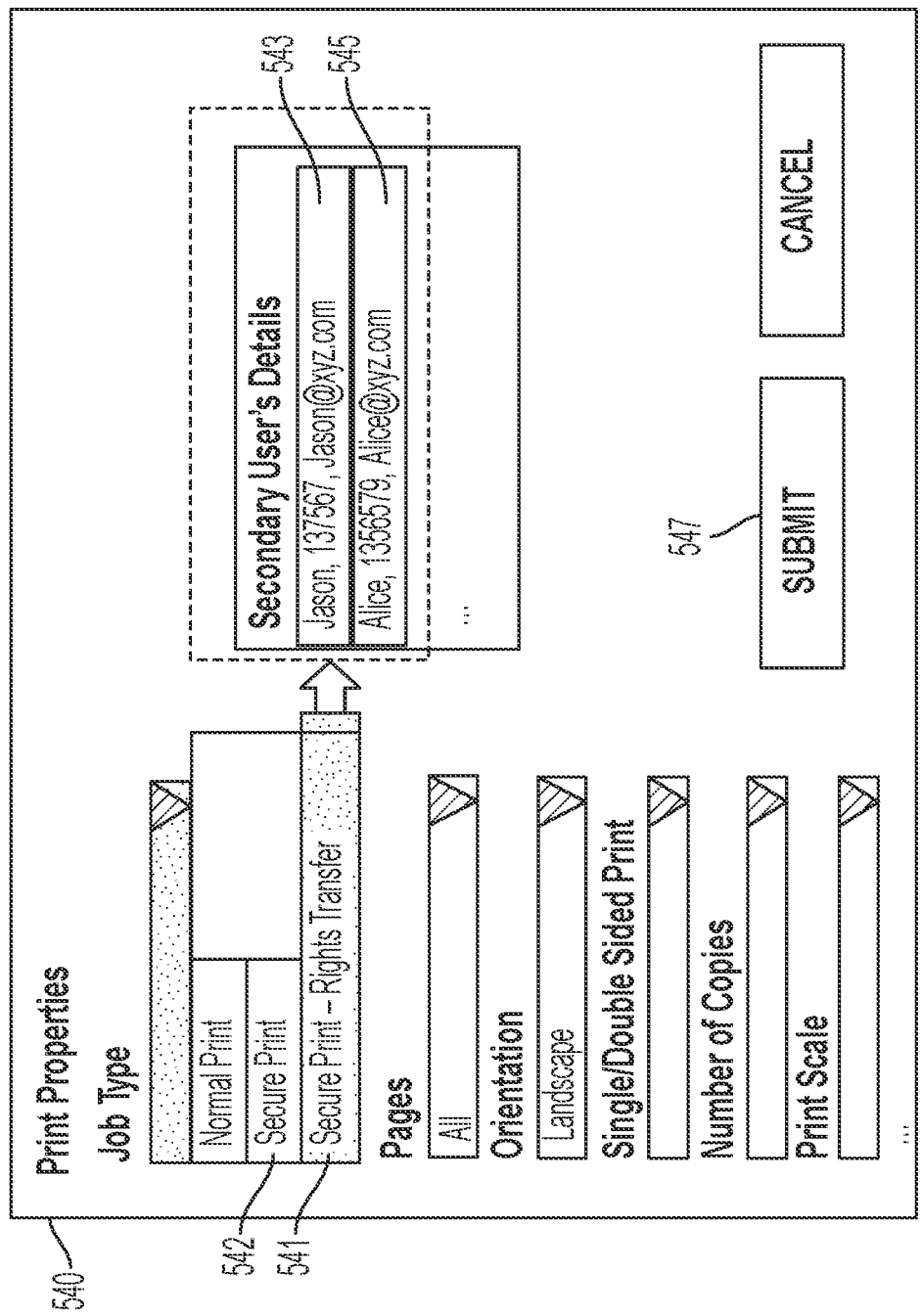

Referring back to the computing device 212, the computing device 212 runs several applications and software to perform various functions. One such example is the print driver 214. The print driver 214 allows a user such as primary user, for example, to give print commands and submit a document for printing. Specifically, the user interface 216 of the print driver 214 allows the primary user to provide various print options/attributes such as number of copies, black & white, print scale, orientation, number of pages, single-sided print, double-sided print, destination address, etc. Further, the user interface 216 of the print driver 214 includes a secure print option that further includes an option to transfer rights. One exemplary user interface 540 illustrating a secure print option 542 is shown in FIG. 5D, where the secure print option 542 further includes Rights transfer option as 541. As shown, the secure print option 542 is presented along with the other pre-defined options such as normal print.

In context of the present disclosure, the selection of the rights transfer option allows the primary user to transfer rights to other users (i.e., one or more secondary users) to release his secure print job. To this end, the primary user requires to provide details of the other users whom he wishes to transfer rights to release the secure print job. The details of the other user can be provided through the user interface 216. The details may include email address, employee id, employee code, phone number, or the like. For example, upon selecting the rights transfer option 541, the primary user submits details such as name (Jason), employee id (137567) and email address (jason@xyz.com) marked as 543, in the user interface 540 of FIG. 5D. Similar to this, the primary user submits details of other secondary user—Alice, 1356579, Alice@xyz.com, marked as 545 in FIG. 5D. The rights transfer option 541 may be presented along with the secure print option or after the selection of the secure print option without limiting the scope of the disclosure. At the time of submitting secondary users' details, the primary user may provide other details through which the secondary user can release the secure print job such as OTP, QR code, employee id, etc. Upon providing all the details, the primary user can successfully submit the details via submit button 547 as shown in FIG. 5D. This way the print driver 214 receives all details i.e., the secure print job, print attributes and all details associated with the rights transfer option 541 such as secondary user details, and other associated details.

Before submitting the secure print job, the primary user authenticates/authorizes himself by inputting his passcode to ensure that he is the owner of the secure print job submitted at the multi-function device 218. As per FIG. 2B, the primary user pre-authorizes the secondary users by providing their identification details to release the secure print job at the multi-function device 218.

Upon receiving all the details including secure print job, print options and details related to transfer rights from the primary user to the secondary user, the print driver 214 sends these to the multi-function device 218 for further processing. Before sending, the print driver 214 may authenticate/authorize the primary user to ensure that the primary user is the owner of the secure print job. To authenticate, the print driver 214 requests the primary user to provide his passcode, which he typically uses to release all his secure print jobs. Based on successful authentication/authorization, the print driver 214 sends the secure print job, print attributes and details related to the transfer rights in a format understandable by the multi-function device 218.

Figure 5E:
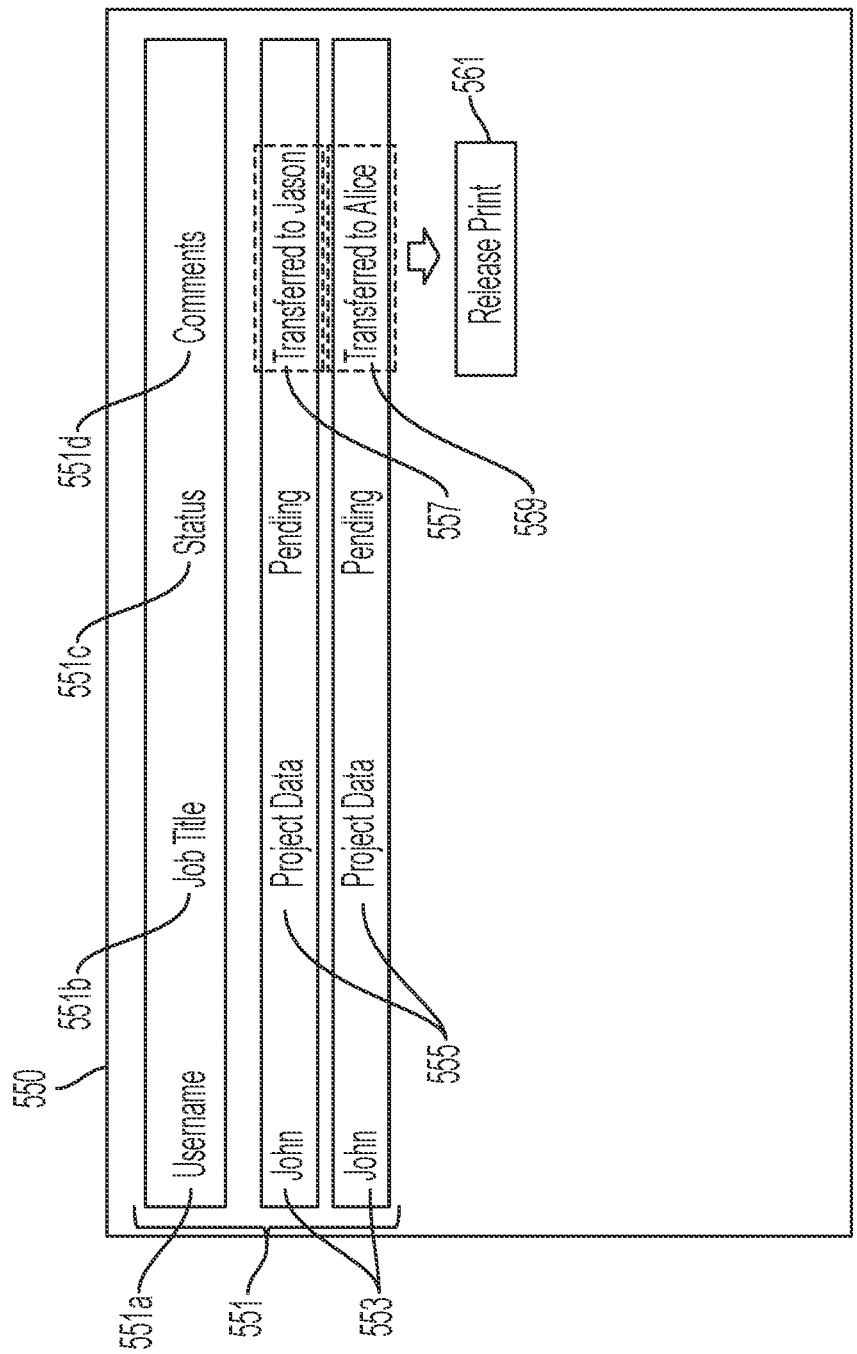

The multi-function device 218 receives all details from the print driver 214, in particular, the controller 224 receives all from the print driver 214. Upon receiving all details from the print driver 214, the controller 224 checks all details associated with the secure print job and identifies that the secure print job as submitted by the primary user is to be transferred to one or more secondary users. The controller 224 checks details of the secondary users and identifies if there is any print job/secure print job available for them. Based on this, the controller 224 adds the secure print job as received in a job queue under the username/profile of the secondary users or under other fields in the job queue. The secure print job may be added to a common job queue which can be seen by all users but can only be released by allowed users i.e., the secondary users—Jason and Alice. One such exemplary user interface 550 is shown in FIG. 5E. The user interface 550 showcases a job queue 551 with various details username 551, job title 551b, status 551c and comments 551d. Here the job (Project Data, marked as 555) submitted by the primary user John 553 is transferred to the secondary users 'Jason' and 'Alice', as clearly depicted in the comments section field 551d. The secure print job 555 is transferred to the secondary user 'Jason' as shown via 557 and the secure print job 555 is also transferred to the other secondary user 'Alice' marked as 559. As per the snapshot 550, the secure print job i.e., project data 555 is transferred to the secondary users—'Jason' and 'Alice'. The secondary users can select the job 555 to release it. For example, the secondary user Jason can release the secure print job 555 available corresponding to his name under the comments section as 557. Similarly, the secondary user Alice can release the secure print job corresponding to his name as indicated under the comment section as 559. Upon selection, release print option 561 is shown to the secondary users.

For simplicity, the secure print job is added to a common job queue as shown in above figures, but the secure print job submitted by the primary user can be added to user specific job queue which can be only be accessed or viewed upon logging into their accounts. For example, the secure print job can be added to secondary user's Jason specific job queue which can only be made visible to the secondary user Jason upon logging into his account at the multi-function device 218. Similarly, the secure print job can be added to the secondary user's job queue i.e., Alice's job queue which can only be made visible to the secondary user upon logging into this account at the multi-function device 218. Further, based on the number of secondary users with who the primary user wishes to transfer rights, the secure print job is added to the job queue at the multi-function device 218. For example, if the primary user adds 2 secondary users with who he wishes to transfer rights, then the secure print job is added 2 times to the job queue 551, each under respective secondary username either in the comments field as 557 or 559, shown in FIG. 5E. This way the secure print job is added to the job queue (common job queue or secondary user's specific job queue) at the multi-function device 218 without limiting the scope of the disclosure.

Once the secure print job is successfully added, the controller 224 notifies each secondary user about availability of the secure print job for them. In some implementations, the controller 224 notifies each secondary user about an upcoming secure print job for them at the multi-function device 218. The secondary users can be notified via text message, IVR calls, email, and so on. The notification may include a pre-defined message—"A new secure print job submitted by another user is available for you" and other details such as name of the primary user, his employee ID, job title, and so on. One exemplary notification may be 'Amit (employee ID 502367) has shared a secure print job titled 'R&D files'.

Once notified, the secondary users can release the secure print job using any option as set by the primary user at the time of submitting the secure print job. For example, the notification received by the secondary user may include an OTP/passcode/QR code that can be inputted/scanned via the user interface 222 of the multi-function device 218 to release the secure print job. For example, if the primary user sets OTP as an option, then the controller 224 generates an OTP for the secondary user which is sent to the secondary user. The secondary user upon receiving the OTP inputs the same at the user interface 222. Upon successful matching, the controller 224 allows the secondary user to release the secure print job. In another example, if the primary user sets passcode as an option, then the controller 224 allows the secondary user to release the secure print job using his passcode. Alternative, the primary user may set a default passcode for the secure print job which can be used by all secondary users to release the secure print job at the multi-function device 218. The secondary user receives the default passcode in the form of notification.

Once the secondary user inputs the required authentication information, the controller 224 communicates with the print engine 228 to initiate printing of the secure print job till completion. The print engine 228 prints the secure print job in accordance with print options/attributes as submitted by the primary user. Once the secure print job is printed successfully, the print engine 228 communicates the controller 224 about the successful printing of the secure print job. The controller 224 finally notifies the primary user regarding the secure job completion i.e., the secure print job is printed successfully, where the notification may be sent in the form of IVR call, text message, email and so on. This way, the secure print job is successfully printed by the secondary users.

As shown, the user interface 222 displays the job queue including the secure print job to the secondary user. Once the secure print job is successfully transferred to the secondary user, the user interface 222 displays the secure print job under a profile/username of the secondary user in the job queue at the multi-function device 218.

The memory 226 stores the secure print job and all details/options as received through the computing device 212. The memory 226 may store all necessary details such default passcode, OTP, QR code and so on for implementing the present disclosure. The controller 224 may retrieve required details from the memory 226 to implement the present disclosure.

Figure 5F:
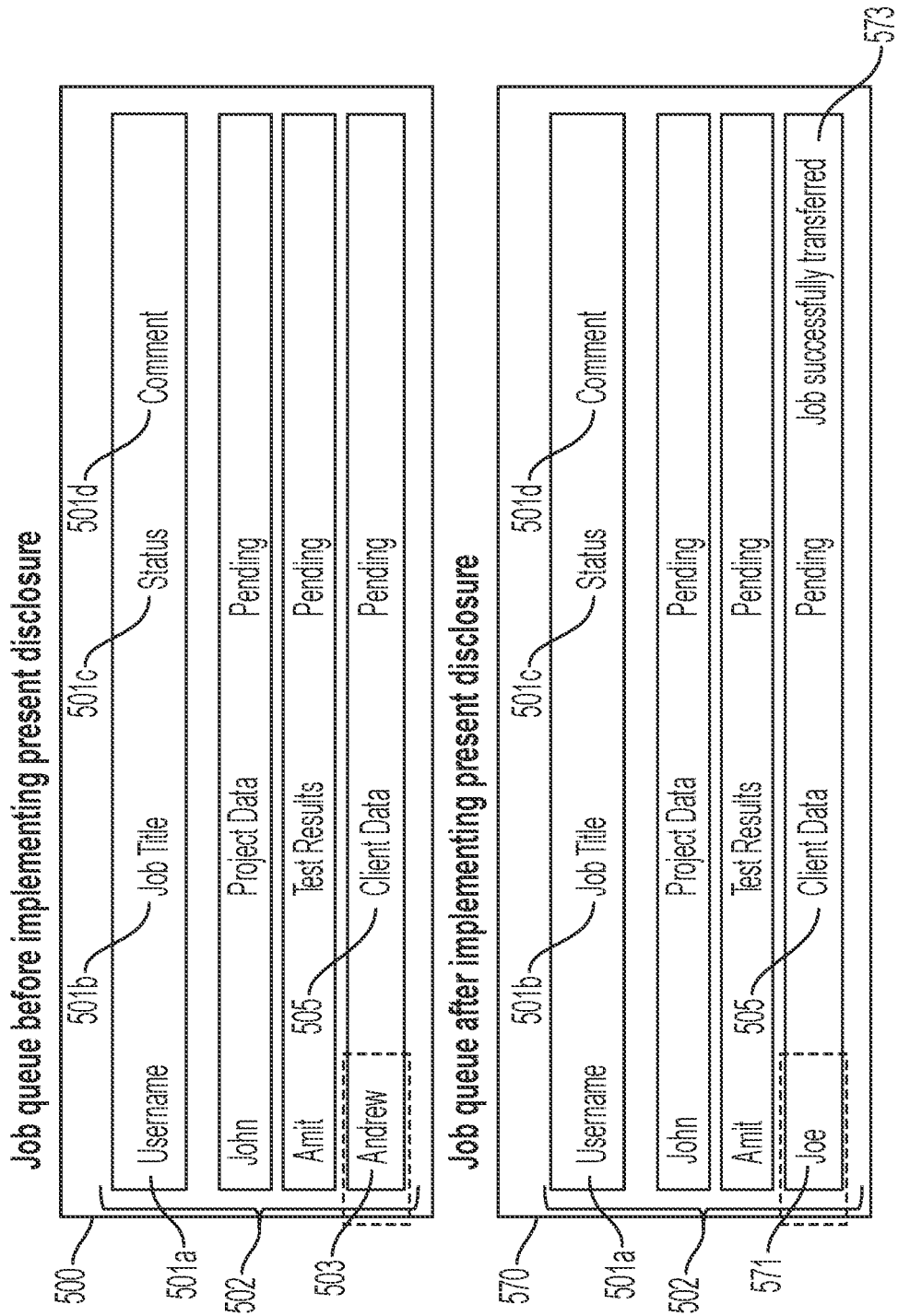

One exemplary snapshot of a job queue 502 before implementing the present disclosure is shown as 500 in FIG. 5F. When the primary user 503 submits the secure print job 505, the job gets logged in the job queue 502 under the name of the primary user. After implementing the present disclosure i.e., once the secure print job 505 is transferred to the secondary user joe, an exemplary view of the job queue 502 is shown in the user interface 570 of FIG. 5F. As per the user interface 570, the name under the username field 501a is changed to the secondary user's name i.e., Joe (marked as 571) to whom the secure print job 505 is transferred. And the information is updated in the comments field 501d as Job successfully transferred marked as 573. The job queue views as discussed in FIG. 5F can be implemented for all scenarios discussed in FIGS. 1A, 1B, 2A and 2B and other FIGs.

Exemplary Flowcharts

Figure 3A:
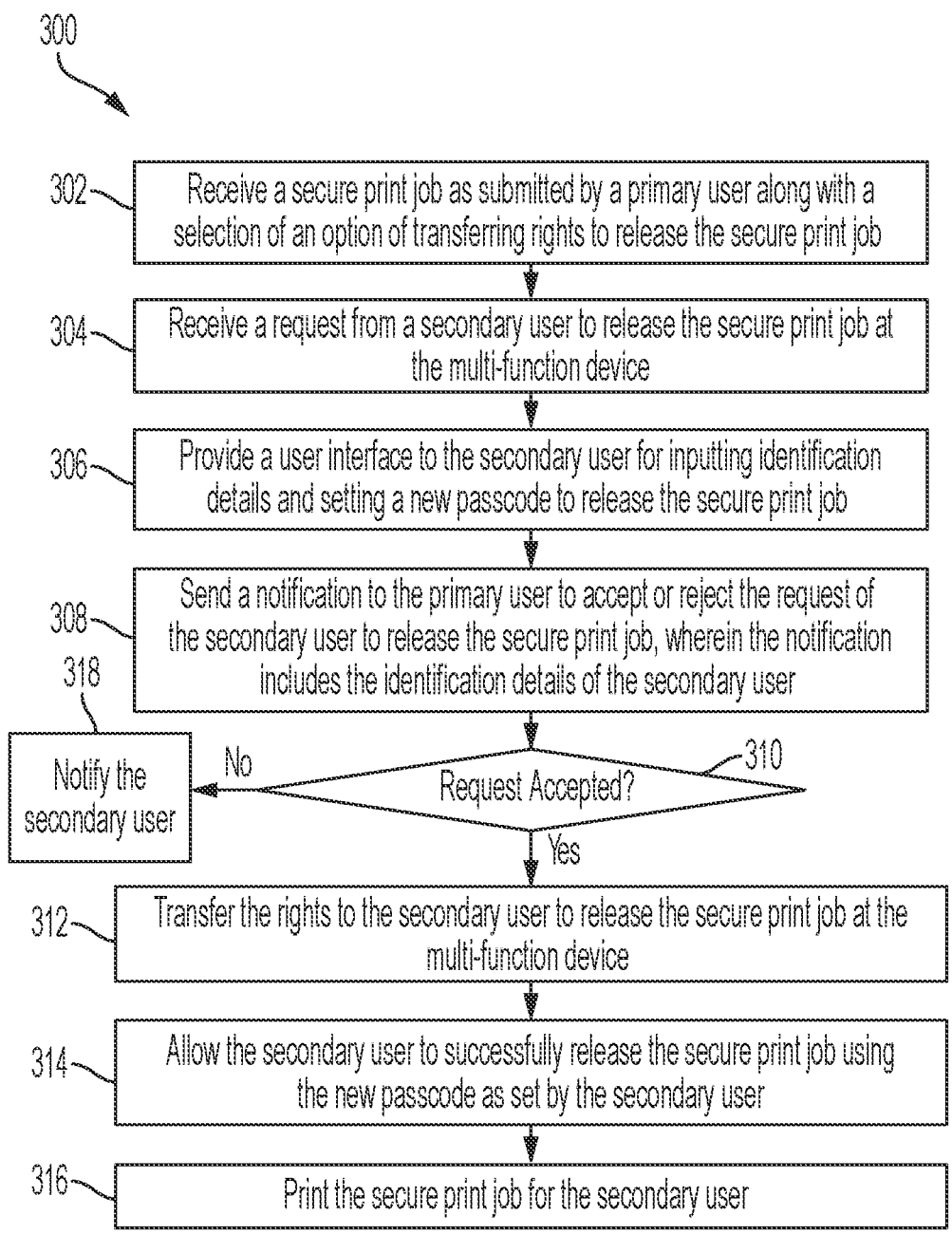
FIG. 3A is a method flowchart for transferring printing rights from a primary user to one or more secondary users, in accordance with an embodiment of the present disclosure.

FIG. 3A is an exemplary method flowchart 300 for transferring rights from a primary user to one or more secondary users to release a secure print job. For simplicity, the flowchart 300 will be discussed with a single secondary user as an example, but it is understood that the rights can be transferred to more than one secondary user without limiting the scope of the disclosure.

According to the method 300, a request to transfer the rights is initiated by one or more secondary users. The request is raised once the secure print job is submitted by a primary user at a multi-function device such as 100. The method 300 is performed at the multi-function device such as 100 where the secure print job is submitted. But the method can be implemented at an equivalent device having capabilities of transferring printing rights from the primary user to the one or more secondary users.

The method 300 begins when a primary user wishes to share a confidential document with a secondary user without wanting to share an e-copy of the document. The primary user submits the document for printing using any computing device having a print driver. While submitting, the print driver provides a user interface displaying various print options. Along with the conventional print options (e.g., number of copies, print scale, orientation, number of pages, etc.), an option to transfer rights to a secondary user to release a secure print job is provided via the user interface. The primary user selects the option and submits the document as a secure print job to the multi-function device. Post submitting, at block 302, the secure print job along with the selection of the option to transfer rights, is received at the multi-function device.

The received secure print job is added to a job queue at the multi-function device. The job queue is visible to all the users and can be accessed by any user via a user interface of the multi-function device. A secondary user accesses the job queue and identifies the secure print job submitted by the primary user. The secondary user identifies the secure print job based on one or more details related to the submitted job, as shown on the user interface of the multi-function device. Exemplary details may be name of the primary user, employee id, employee code, phone number, comments, or the like. Once identified, the secondary user selects the secure print job in the job queue and raises a request to transfer rights by selecting the option 504 as shown in FIG. 5A (discussed above). Once selected, the request to release the secure print job is received by the multi-function device from the secondary user at 304.

Once the request is received, at block 306, the secondary user is provided with a user interface to input his identification details (such as username, user id, employee id, employee code) and set a new passcode to release the secure print job. The identification details help the primary user identify the secondary user and the new passcode is set by the secondary user to release the secure print job originally submitted by the primary user. The new passcode may include a numeric password, an alphanumeric password, or other suitable password options either alone or in combination.

Once the details and new passcode are submitted, a notification is sent to the primary user to accept or reject the request for transferring printing rights or to release the secure print job at the multi-function device, at block 308. The notification can be shared with the primary user via an IVR call, a text message, an email, a QR code, or a combination thereof. More details to send notification to the primary user will be discussed in FIGS. 3B-3D. Here, the notification includes a pre-defined message and identification details of the secondary user so that the primary user can recognize the secondary user and take a decision whether to transfer the rights or not. The pre-defined message may be "Jason wants to access a secure job ABC at the multi-function device". The notification further includes an option to accept or reject the secondary user's request to release the secure print job. The primary user accesses his computing device, for example, a laptop, to view the notification and the included details. Upon viewing, the primary user either accepts or rejects the secondary user's request.

At block 310, it is determined whether the request is accepted by the primary user or not. If the request is accepted by the primary user, the method 300 proceeds further, else the secondary user is notified about the request rejection, at block 318. The secondary user may be notified via a text message, an email, etc.

If the primary user accepts the request, at block 312, the rights are transferred to the secondary user to release the secure print job at the multi-function device. The rights to release are transferred by changing the ownership of the secure print job and/or other details. For example, the name against the secure print job present in the job queue is changed from a primary user's name to a name of the secondary user. In another example, a name of the secondary user to whom the rights to release the secure print job are transferred, is shown in comments section as shown in FIG. 5C. Once the rights to release the secure print job are transferred, the secondary user is notified via a text message, an email, an IVR call, and so on. Subsequently, the secondary user can access the secure print job at the multi-function device.

To release the secure print job, the secondary user is required to input the new passcode as set by the secondary user while raising the request to release the secure print job. The secondary user inputs the new passcode via the user interface of the multi-function device. The new passcode input by the secondary user is matched with the new passcode as stored. Upon successful matching, the secondary user is allowed to release the secure print job at the multi-function device, at block 314.

At block 316, the secure print job is printed after the successful validation of the new passcode. The secure print job is successfully printed for the secondary user. This way, the method 300 allows other users (secondary users) to release the secure print job originally submitted by a different user (primary user).

Figure 3B:
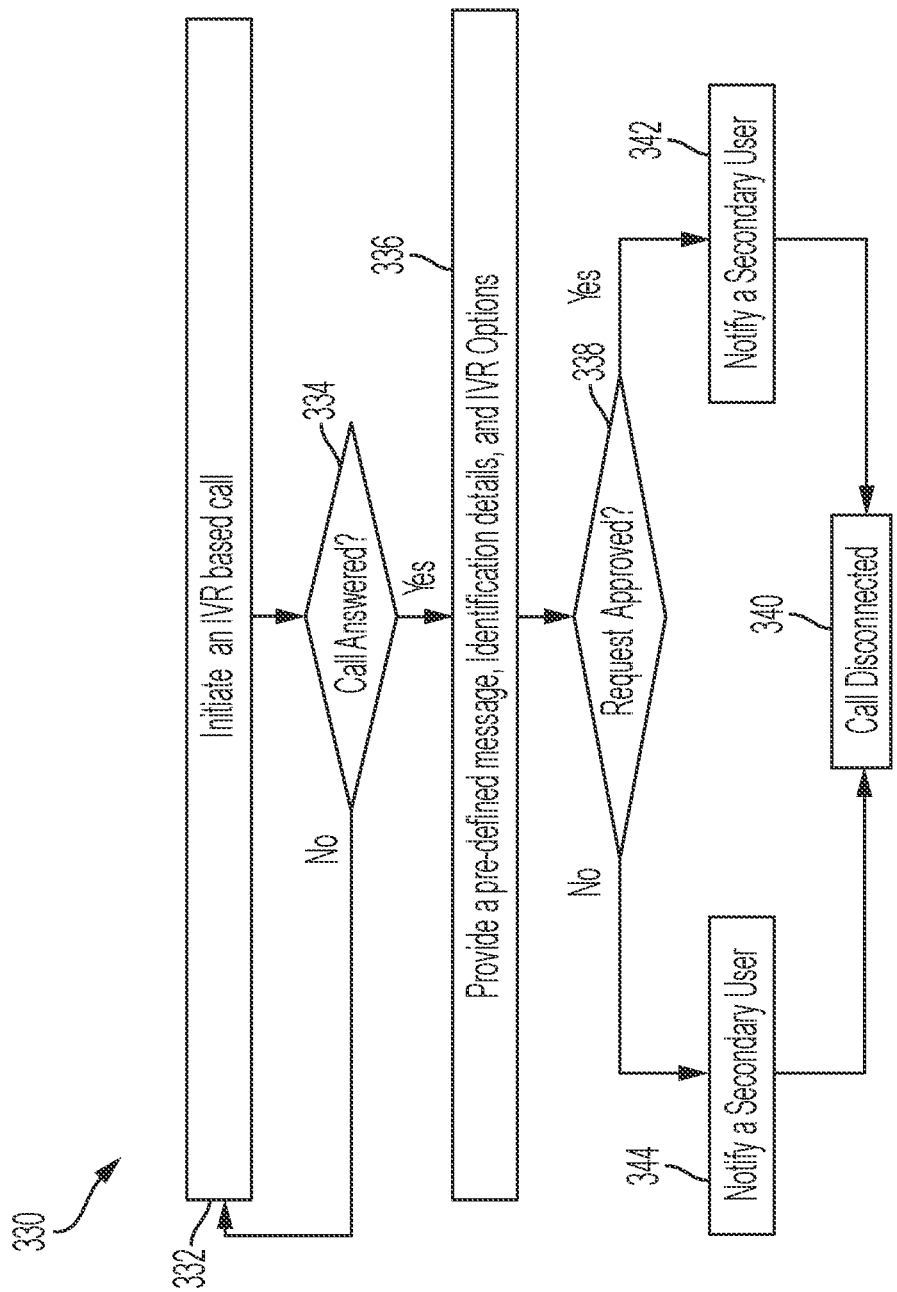
FIGS. 3B-3D are method flowcharts for notifying the primary user, in accordance with embodiments of the present disclosure.
Figure 3C:
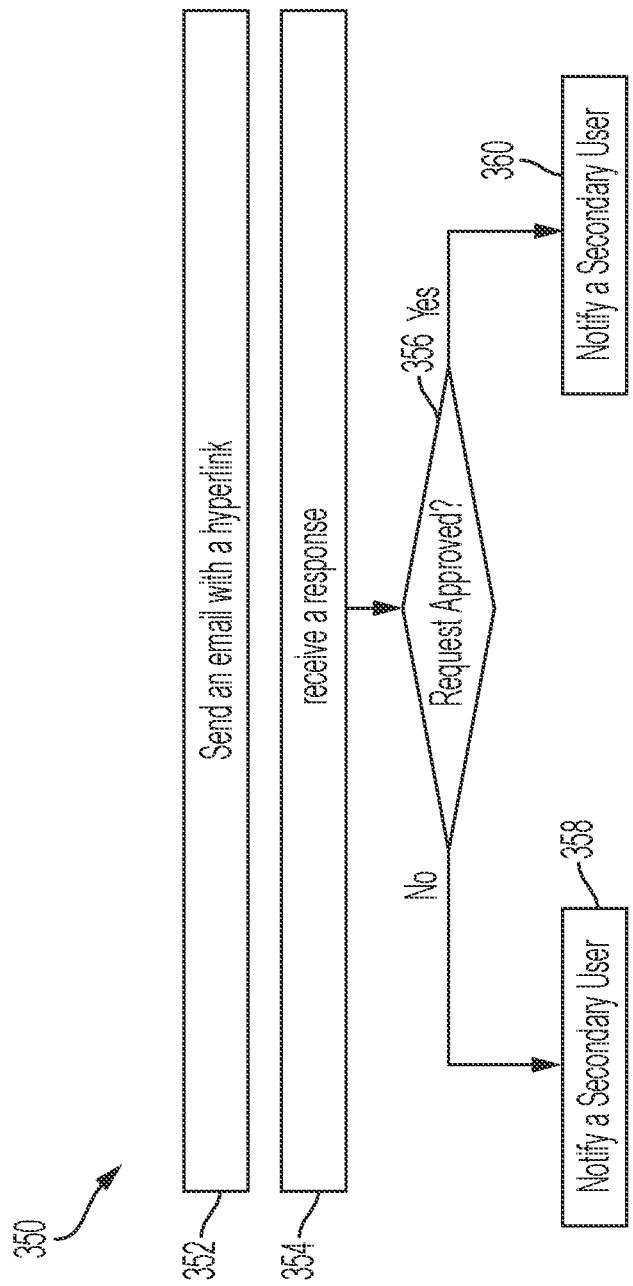
Figure 3D:
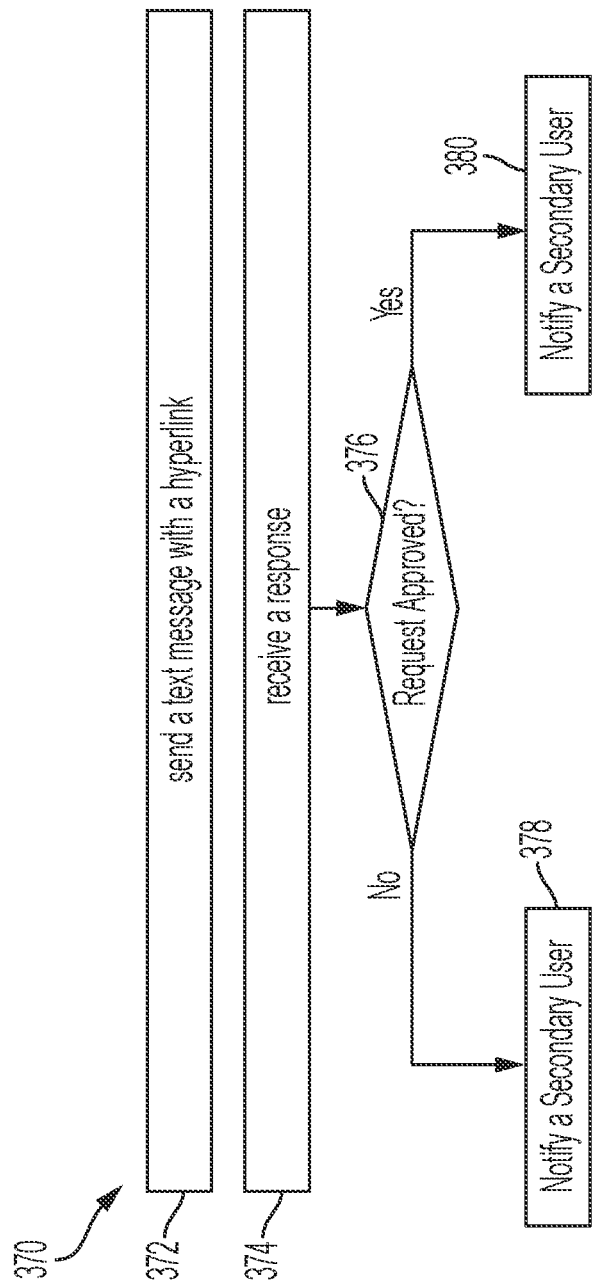

FIGS. 3B-3D represent method flowcharts for notifying the primary user when the secondary user raises the request to release the secure print job. While the methods discussed in FIGS. 3B-3D are implemented along with the method of FIG. 3A, it should be noted that the notification methods discussed herein can be implemented with various other methods for notifying the primary users when the secondary user requesting for transferring printing rights without departing from the scope of current disclosure.

FIG. 3B is a method flowchart 330 to notify the primary user via an IVR call. The method 330 is performed by the multi-function device such as 100, 106, 200 and 218. The method 330 is implemented when the secondary user requests for transferring printing rights. In such cases, the primary user is notified about such request.

At block 332, an IVR-based call is initiated, where the multi-function device places a call request to the primary user based on his number registered with the multi-function device.

At block 334, it is determined if the IVR call is answered or not. If the primary user picks the call, the method 330 proceeds further. Else, the IVR call is re-initiated to contact the primary user. The IVR call may be attempted again/re-initiated for a pre-defined number of attempts, e.g., three attempts and after the pre-defined number of attempts, the method 330 stops. In such scenario, after the pre-defined number of attempts, the response of the primary user is considered as rejected and the same is notified to the secondary user.

If the primary user picks the call, a pre-defined message along with the identification details of the secondary user is provided to the primary user, at block 336. In addition, the notification includes IVR options to accept or reject the request as raised by the secondary user. Exemplary pre-defined message can be "Jason wants to release the secure print job ABC at the multi-function device". The identification details of the secondary user are provided so that the primary user can recognize the secondary user and take a decision whether to accept or reject the request of the secondary user. Further, the IVR options provided to receive response from the primary user may be "select '1' to accept the request" and "select '2' to reject the request", etc.

At block 338, it is determined whether the primary user approves/accepts the secondary user's request. If accepted, the secondary user is notified about the acceptance at 342. If the primary user rejects, the secondary user is notified about the rejection at 344. Consequently, the call gets disconnected at 340 in both the scenarios.

FIG. 3C is a method flowchart 350 to notify the primary user via an e-mail. The method 350 is performed by the multi-function device such as 100, 106, 200 and 218. The method 350 is implemented when the secondary user requests for transferring printing rights. In such cases, the primary user is notified about such request.

At block 352, an e-mail along with a hyperlink is sent to the primary user. The email includes a pre-defined message for the primary user, identification details of the secondary user and the hyperlink, which is linked to an approval page. The email id is the email already registered with the multi-function device. Exemplary pre-defined message can be "The secondary user wants to access your secure job at the multi-function device". The identification details of the secondary user are provided so that the primary user can recognize the secondary user and take a decision whether to accept or reject the request. Exemplary details include username, role/designation, complete name, email ID, employee ID, mobile number, etc. The hyperlink is linked to the approval page to receive the response from the primary user for the request raised by the secondary user. Once the primary user clicks the hyperlink, the user is redirected to the approval page, which further includes options to accept or reject the request.

At block 354, the response is received based on the option selected by the primary user on the approval page.

At block 356, it is determined whether the request is accepted by the primary user or not. Subsequently, the secondary user is notified regarding the acceptance or rejection of the request. If the request is approved/accepted by the primary user, then the secondary user is notified about the acceptance at 360. If the request is rejected by the primary user, the secondary user is notified about the rejection at 358.

If the primary user does not respond to the e-mail within a specified time window, for example within half an hour, then the response of the primary user is considered as rejected.

FIG. 3D is a method flowchart 370 to notify the primary user via a text message. The method 370 is performed by the multi-function device such as 100, 106, 200 and 218. The method 370 is implemented when the secondary user requests for transferring printing rights. In such cases, the primary user is notified about such request.

At block 372, a text message with a hyperlink is sent to the primary user. The text message is sent by the controller of the multi-function device. The text message includes a pre-defined message for the primary user, identification details of the secondary user and the hyperlink, which is linked to an approval page.

At block 374, the response is received based on the option selected by the primary user on the approval page.

At block 376, it is determined whether the request is approved by the primary user or not. Subsequently, the secondary user is notified regarding the acceptance or rejection of the request. If the request is approved/accepted by the primary user, then the secondary user is notified about the acceptance at 380. If the request is rejected by the primary user, the secondary user is notified about the rejection at 378.

If the primary user does not respond to the text message within a specified time window, for example within half an hour or one hour, then the response of the primary user is considered as rejected.

Figure 4:
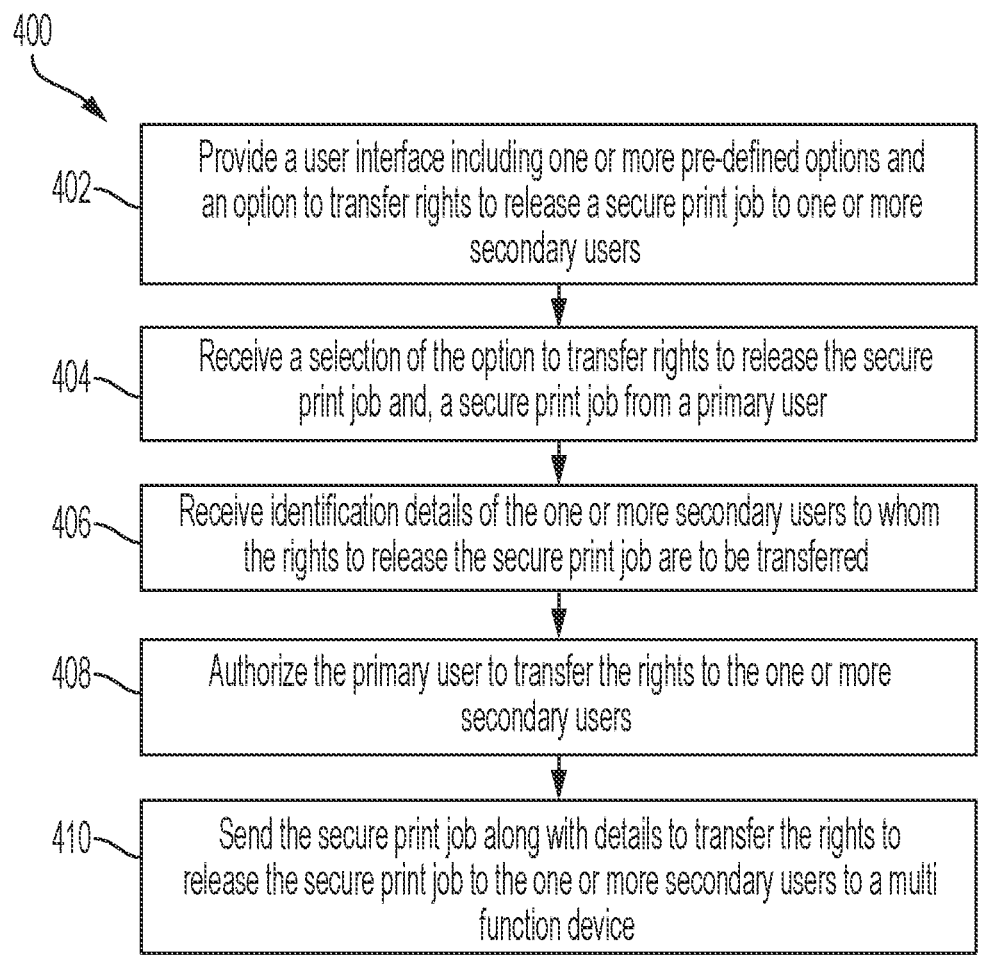
FIG. 4 is another method flowchart for transferring printing rights from a primary user to one or more secondary users.

FIG. 4 is another method flowchart 400 for authorizing one or more secondary users to release a secure print submitted by a primary user. According to the method flowchart 400, a request to transfer the rights to a secondary user is initiated by the primary user. The request is raised while submitting a secure print job for printing to a multi-function device such as 106 or 218.

The method 400 begins when the primary user selects a document for secure printing and wishes to transfer the printing rights to a secondary user.

The primary user submits a print command for printing a document using his computing device having a print driver. Upon submitting the print command by the user, the print driver provides a user interface displaying one or more pre-defined options and an option to transfer rights to one or more secondary user to release the secure print job, at block 402. The pre-defined options may be number of copies, print scale, orientation, number of pages, etc.

The primary user selects the option to transfer the printing rights to the secondary users which is received by the print driver along with the secure print job, at 404. After the primary user selects the transfer rights option, the print driver prompts the primary user to provide a list of secondary users to whom the rights for releasing the secure print job are to be transferred along with their details, as illustrated in FIG. 5D. The details may include suitable information associated with the secondary users, which are sufficient to accurately identify the secondary users. For example, username, role/designation, complete name, email ID, employee ID, mobile number, and the like.

The identification details of the one or more secondary users to whom the rights are to be transferred is received at block 406. Along with the identification details, the primary user sets an authentication method for the secondary user to release the secure print job, such as OTP, QR code, default passcode or a combination thereof. At block 408, then the primary user is authorized/authenticated to transfer the rights to the one or more users. The authorization of the primary user is required to ensure the primary user is the owner of the secure print job. The primary user may be authorized based on his passcode to release his any secure print job. Upon successful authorization, the secure print job along with information associated with the secure print job are transmitted to the multi-function device by the print driver, at block 410. The information includes print attributes (such as colored/black and white print, single/double sided print, landscape/portrait mode, etc.), the list of the secondary users to whom the rights to release the secure print job is to be transferred along with other details.

The multi-function device then receives the secure print job, and all details associated with the job from the printer driver. Then, the multi-function device analyzes the secure print job and the details as received. After analyzing, the secure print job is added to a job queue corresponding to the secondary users at the multi-function device. Once successfully added, the rights to release the secure print job are transferred to the secondary users listed by the primary user. When the secondary user wishes to release the secure print job, the multi-function device allows the secondary users to release the secure print job based on a method as set by the primary user. For example, if the primary user sets OTP as authentication method for the secondary user to release the secure print job, then the multi-function device sends an OTP to the secondary user. The secondary user then inputs the received OTP which is then matched at the multi-function device. Upon successfully matching, the secondary user is allowed to release the secure print job which is originally submitted by the primary user.

Figure 6:
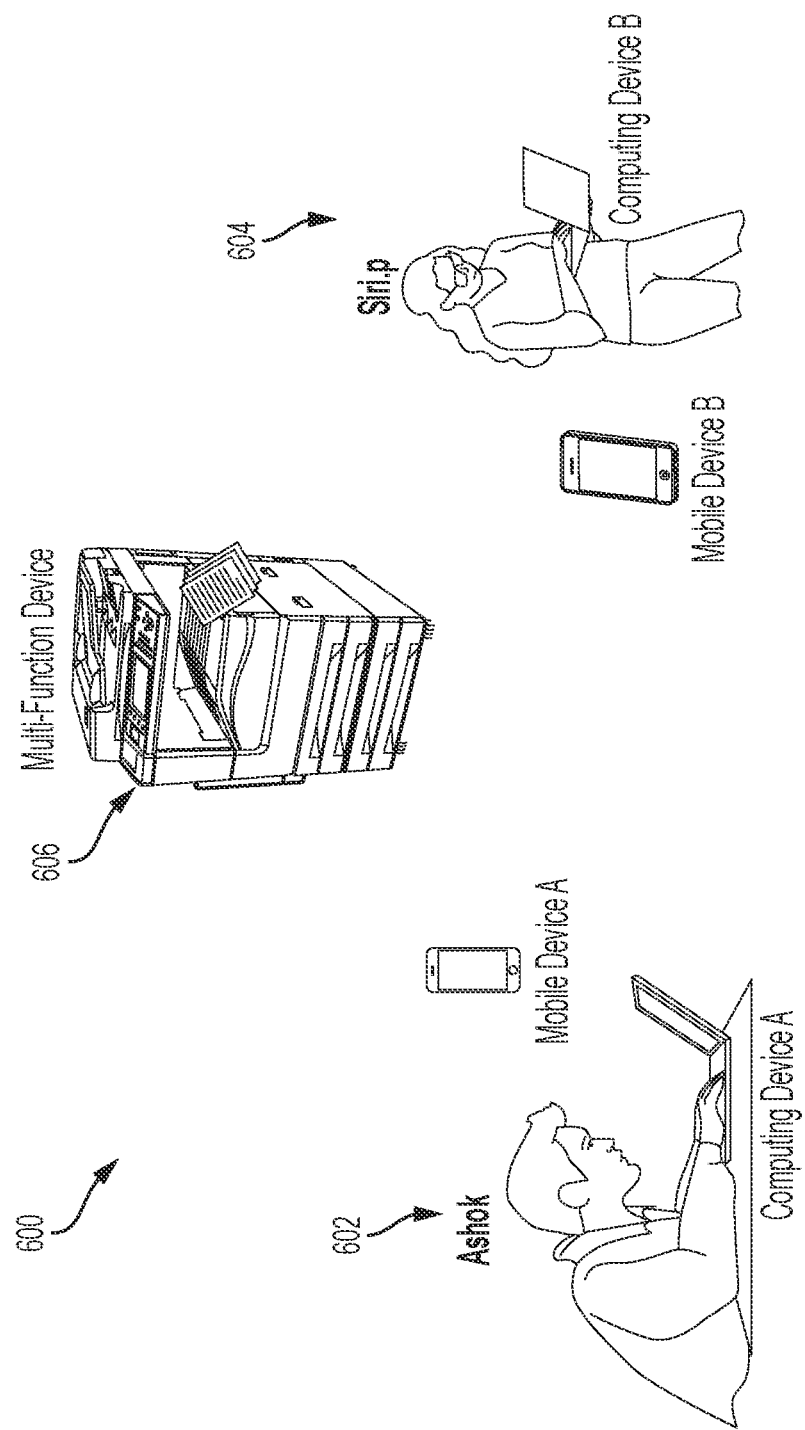
FIG. 6 shows an exemplary environment for implementing the present disclosure.

FIG. 6 shows an exemplary environment 600 where the present disclosure is implemented. The environment 600 includes one or more users 602, 604, one or more computing devices and a multi-function device 606. Of the one or more users, 602 is a primary user named, 'Ashok', and 604 is a secondary user named 'Siri.p'. The computing devices include a computing device A, a mobile device A which are used by the primary user Ashok 602. The computing device B and the mobile device B are used by the secondary user Siri.p 604. It can be considered that the primary user 602 wishes to share a confidential document with the secondary user 604 without sharing an e-copy of the document.

Figure 7A:
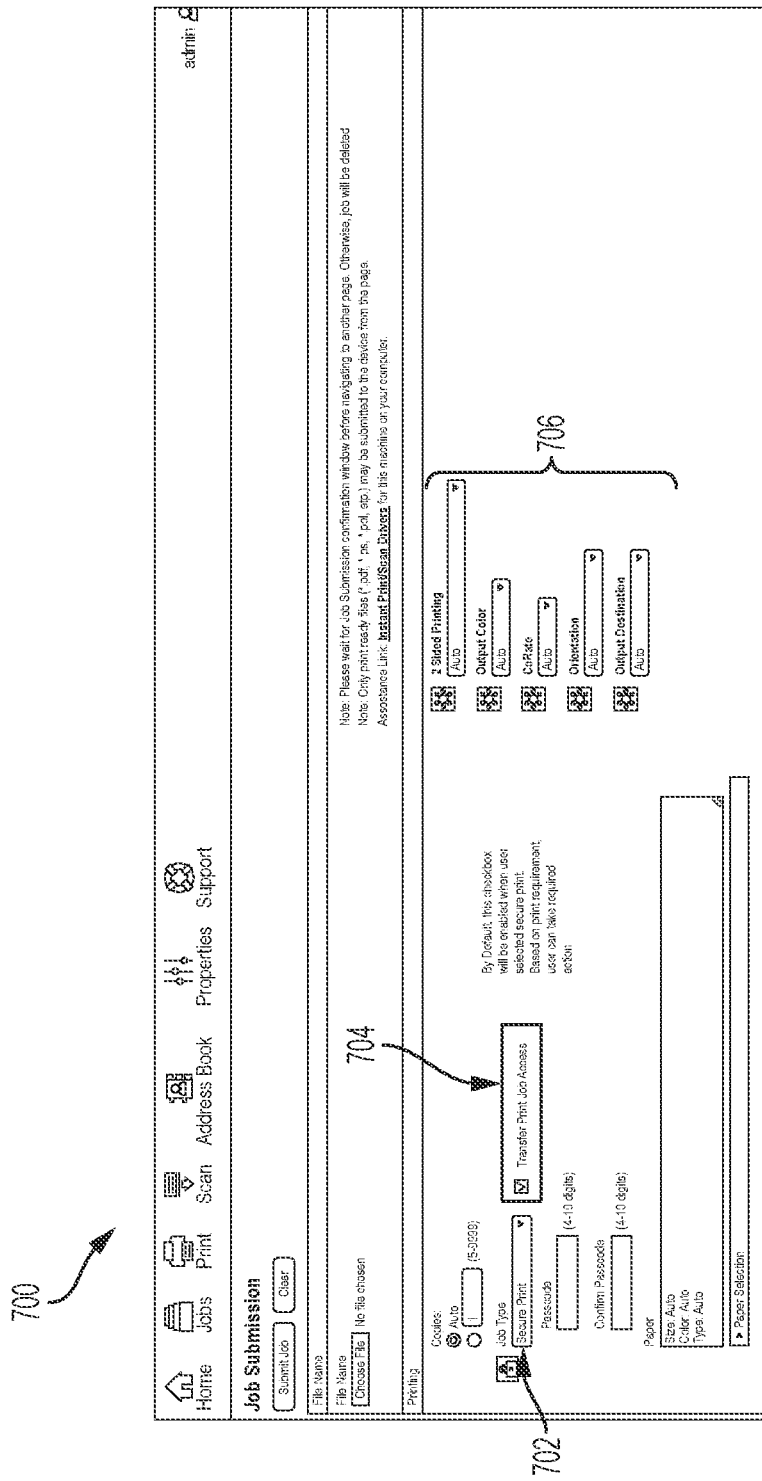
FIGS. 7A-7F show exemplary snapshots of user interfaces provided while implementing the exemplary environment of FIG. 6.
Figure 7B:
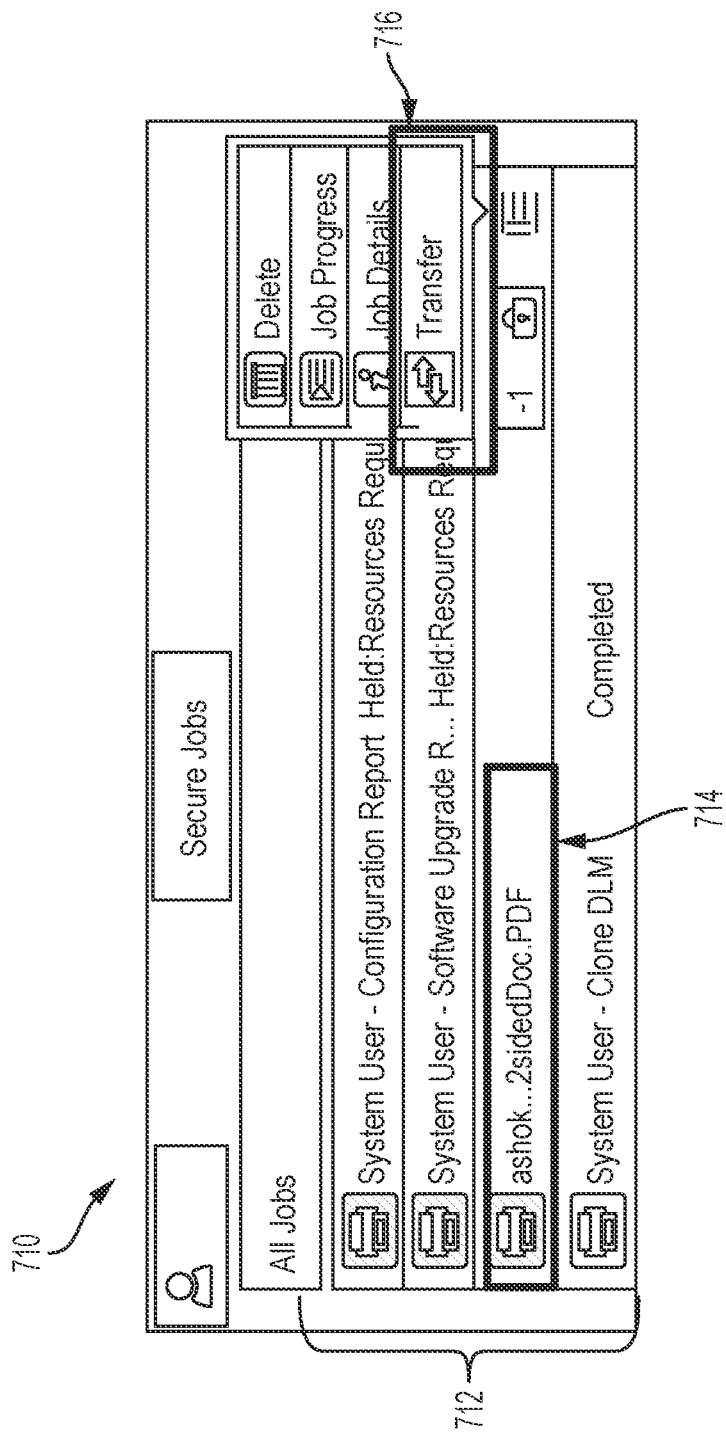
Figure 7C:
Figure 7D:
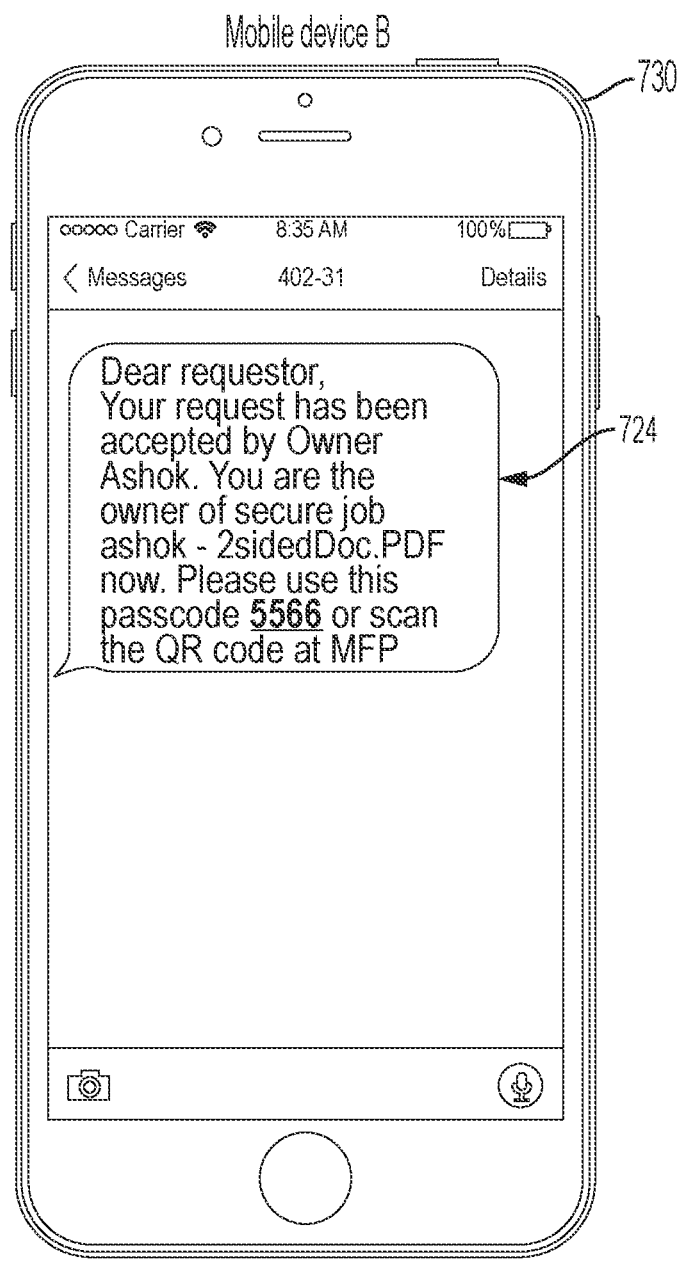

In implementation, the primary user 602 accesses the computing device A and submits a print command for the document. Upon submitting the print command, the print driver shows a secure print option 702 in the user interface 700 of FIG. 7A. The secure print option 702 further includes an option to transfer print job access 704. The user interface 700 shows other print attributes such as output color, orientation, destination etc., collectively marked as 706. Then, the print driver sends the secure print job and other relevant details to the multi-function device 606 for further processing. The multi-function device 606 adds the secure print job of the primary user 602 to a job queue 712 as shown in the user interface 710 of FIG. 7B. Here, the user interface 710 shows a job queue 712 including multiple secure jobs submitted at the multi-function device 606. The job queue 712 includes a secure print job titled 'ashok—2sided-Doc.pdf', which is the secure print job submitted by the primary user 602. Then, the secondary user 604 access the job queue 712 and identifies the primary user's job based on his name such as Ashok. Once identified, the secondary user 604 selects the secure print job, the selection is shown via 714. Upon selection, one or more options such as delete, job progress etc. are displayed. In context of the current disclosure, the transfer option marked as 716 is shown to the secondary user 604. The secondary user 604 selects the option 716 to initiate a request to transfer the secure print job to himself. Upon selection, a box 722 is displayed to the secondary user 604 as shown in the user interface 720 of FIG. 7C. The box 722 shows details of the secure print job and further requests the secondary user 604 to input details such as username, role, and his mobile number. The details are then sent to the primary user 602 for approval. If the primary user 602 accepts the secondary user's request, then a notification such as message is sent to the secondary user 604 on his mobile device as shown in FIG. 7D. The message marked as 724 is sent on the mobile device A of the secondary user 604 as shown in the user interface 730 of FIG. 7D. The messages 724 includes pre-defined details and passcode using which the secondary user 604 can release the secure print job.

Figure 7E:
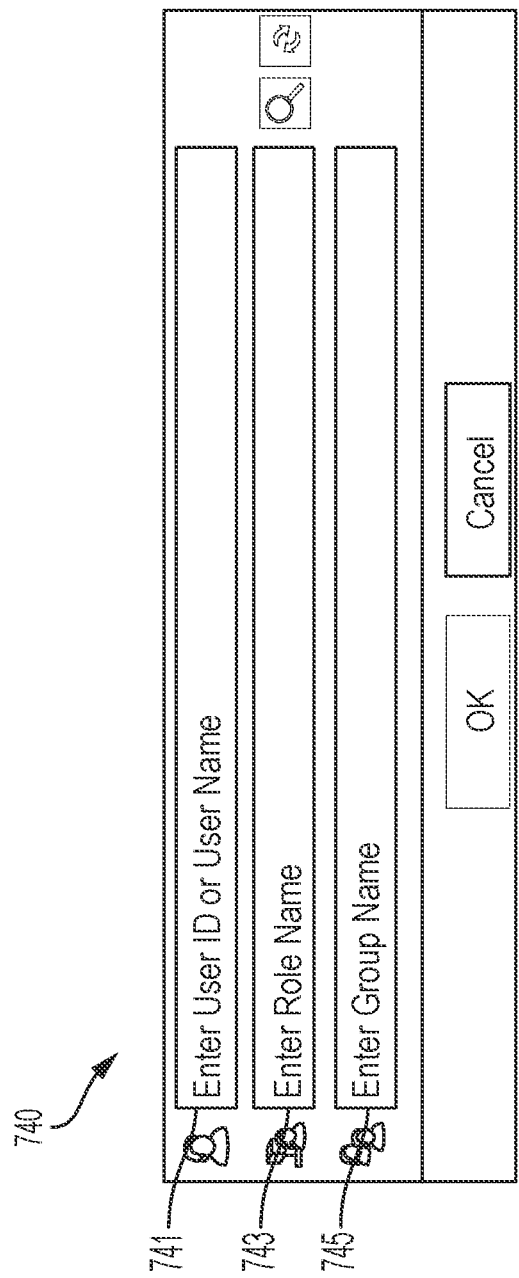
Figure 7F:
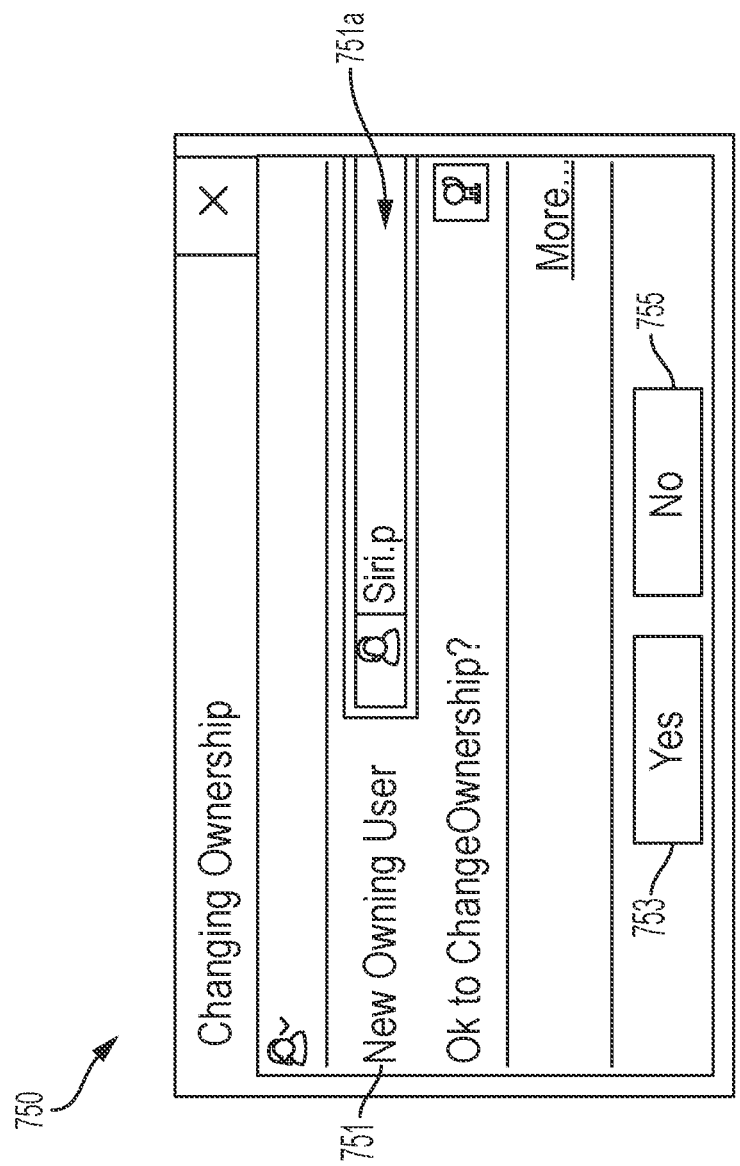

There can be scenarios where the primary user 602 initiates the request to transfer the secure print job to the secondary user 604. This can be done by providing details of the secondary user 604 at the time of submitting the secure print job. As shown in the user interface 740 of FIG. 7E, the primary user 602 can provide details of the secondary user 604 such as user id (marked as 741), role name (marked as 743), and group name (745). Once submitted, another user interface 750 as shown in FIG. 7F is displayed. The user interface 750 indicates the ownership of the secure print job is changed. The user interface 750 shows that the new owner of the job is the secondary user Siri.p 604 (shown via 751a) under the field New owning user (marked as 751) and further requests the primary user Ashok 602 to confirm. The primary user Ashok 602 can confirm by selecting the option Yes (marked as 753) or by selecting other option No (marked as 755). Upon successful confirmation, the rights are transferred to the secondary user Siri.p 604 at the multi-function device 606. This way the primary user 602 pre-authorizes the secondary user Siri.p 604 to release the secure print job at multi-function device 606. This way, the current disclosure can be used to transfer printing rights from the primary user Ashok 602 to the secondary user Siri.p 604 in an easy and efficient manner.

The methods and systems can be implemented for any requirements of sharing a document such as a confidential document without sharing an e-copy or without requiring an owner of the job (i.e., primary user) to stand in a queue for collecting print outs for someone else (i.e., secondary users). The disclosure may be useful for small business and locations where access to computers/laptops may be limited. The disclosure can be implemented in any organization.

The present disclosure discloses methods and systems for transferring print rights or rights to release a secure print job from one user to one or more other users. The methods and systems provide facility to remotely request and grant access to jobs that belong to someone else. This can all be done without exchanging personal information between the users involved i.e., the primary user and the secondary users. The methods and systems are implemented such that the primary user does not require to share his PIN or password for releasing his secure print job by other users. The methods and systems provide a simple and a reliable approach and further saves time/effort of the primary user. The methods and systems allow the primary user to initiate a request to transfer rights to one or more secondary users and also allows secondary users to initiate a request to transfer rights to them.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, sending, accepting, rejecting, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for transferring rights from one user to another user, to release a secure print job at a multi-function device, the method comprising:
   at the multi-function device:
      receiving a secure print job as submitted by a primary user along with a selection of an option for transferring rights to release the secure print job;
      receiving a request from a secondary user to release the secure print job at the multi-function device;
      upon receiving the request, providing a user interface to the secondary user for inputting identification details and setting a new passcode to release the secure print job;
      upon receiving the identification details and the new passcode, sending a notification to the primary user to accept or reject the request of the secondary user to release the secure print job, wherein the notification comprises the identification details of the secondary user; and
      if the primary user accepts the request of the secondary user, performing the following:
         transferring the rights to the secondary user to release the secure print job at the multi-function device;
         allowing the secondary user to successfully release the secure print job using the new passcode as set by the secondary user; and
         printing the secure print job for the secondary user.

2. The method of claim 1, further comprising, if the primary user accepts the request of the secondary user, notifying the secondary user about the acceptance.

3. The method of claim 1, further comprising, if the primary user rejects the request of the secondary user, notifying the secondary user about the rejection.

4. The method of claim 1, herein transferring comprises changing the ownership of the secure print job from the primary user to the secondary user in a job queue at the multi-function device.

5. The method of claim 1, further comprising, displaying the secure print job under a name of the secondary user in a job queue at the multi-function device, via a user interface.

6. The method of claim 1, further comprising, authorizing the primary user to accept or reject the secondary user's request.

7. The method of claim 1, further comprising, notifying the primary user when the secure print job is successfully released by the secondary user at the multi-function device.

8. A multi-function device for transferring rights from one user to another user, to release a secure print job, the multi-function device comprising:
   a controller for:
      receiving a secure print job as submitted by a primary user along with a selection of an option of transferring rights to release the secure print job;
      receiving a request from a secondary user to release the secure print job at the multi-function device;
      requesting the secondary user for inputting identification details and setting a new passcode to release the secure print job;
      upon receiving the identification details and the passcode, sending a notification to the primary user to accept or reject the request of the secondary user to release
the secure print job, wherein the notification comprises identification details of the secondary user; and
   if the primary user accepts the request of the secondary user, performing the following:
      transferring the rights to the secondary user to release the secure print job; and
      allowing the secondary user to successfully release the secure print job using the new passcode as set by the secondary user;
   a print engine for printing the secure print job for the secondary user; and
   a user interface for:
   displaying a job queue to the secondary user;
   allowing the secondary user to raise the request to release the secure print job submitted by the primary user; and
   inputting the identification details and the new passcode for releasing the secure print job.

9. The multi-function device of claim 8, wherein the controller is for notifying the secondary user about the acceptance if the primary user accepts the request of the secondary user.

10. The multi-function device of claim 8, wherein the controller is for notifying the secondary user about the rejection if the primary user rejects the request of the secondary user.

11. The multi-function device of claim 8, wherein transferring comprises assigning the secure print job to the secondary user in the job queue at the multi-function device.

12. The multi-function device of claim 8, wherein the user interface is for displaying the secure print job under a profile of the secondary user in the job queue at the multi-function device.

13. The multi-function device of claim 8, wherein the controller is for authorizing the primary user to accept or reject the secondary user's request.

14. The multi-function device of claim 8, wherein the controller is for notifying the primary user about the release of the secure print job if the secondary user successfully releases the secure print job at the multi-function device.

15. A method for transferring rights from one user to another user, to release a secure print job, the method comprising:
   providing a user interface comprising one or more pre-defined options and an option to transfer rights to one or more secondary users to release the secure print job;
   receiving the secure print job as submitted by a primary user along with a selection of an option for transferring rights to release the secure print job;
   receiving a selection of the option to transfer rights to release the secure print job and, a secure print job from a primary user;
   receiving identification details of the one or more secondary users to whom the rights to release the secure print job are to be transferred;
   authorizing the primary user to transfer the rights to the one or more secondary users; and
   sending the secure print job along with details to transfer the rights to the one or more secondary users to release the secure print job, to a multi-function device for printing.

16. The method of claim 15, further comprising, after successful authorization, transferring rights to the one or more secondary users to release the secure print job.

17. The method of claim 16, wherein transferring comprises adding the secure print job in a job queue corresponding to the one or more secondary users.

18. The method of claim 15, further comprising notifying the one or more secondary users about the secure print job's availability in a job queue at a multi-function device.

19. The method of claim 15, further comprising allowing the one or more secondary users to release the secure print job at the multi-function device.

20. A computing device for transferring rights from one user to another user, to release a secure print job, the computing device comprising:
   a print driver for:
      providing one or more pre-defined options and an option to transfer rights to one or more secondary users to release a secure print job;
      receiving the secure print job as submitted by a primary user along with a selection of an option for transferring rights to release the secure print job;
      receiving a selection of the option to transfer rights and a secure print job from a primary user;
      receiving identification details of the one or more secondary users to whom the rights to release the secure print job are to be transferred;
      authorizing the primary user to transfer the rights to the one or more secondary users; and
      sending the secure print job along with details to transfer the rights to release the secure print job to the one or more secondary users, to a multi-function device.

21. The computing device of claim 20, wherein the print driver is for notifying the one or more secondary users about the secure print job's availability in a job queue at a multi-function device.

22. The computing device of claim 20 is communicatively coupled to the multi-function device, wherein the multi-function device is for transferring rights to the one or more secondary users to release the secure print job.

23. The computing device of claim 20 is communicatively coupled to the multi-function device, wherein the multi-function device is for adding the secure print job in a job queue corresponding to the one or more secondary users.

24. The computing device of claim 20 is communicatively coupled to the multi-function device, wherein the multi-function device is for allowing the one or more secondary users to release the secure print job at the multi-function device.

25. A method for allowing a user to release a secure print job on behalf of another user, the method comprising:
- receiving a request from a secondary user to release the secure print job submitted by a primary user for printing at a multi-function device;
- sending the request of the secondary user to the primary user for acceptance or rejection; and
- based on the response of the primary user, allowing the secondary user to release the secure print job at the multi-function device as submitted by the primary user.

26. The method of claim 25, further comprising, requesting the secondary user to provide identification details and set a new passcode to release the secure print job.

27. The method of claim 25, further comprising, releasing the secure print job using the new passcode set by the secondary user.

* * * * *